US012799678B2

(12) United States Patent
Valdesueiro et al.

(10) Patent No.: US 12,799,678 B2
(45) Date of Patent: Nov. 17, 2026

(54) PAPER COATING COMPOSITIONS COMPRISING RUBBER AND INSOLUBLE ALPHA-GLUCAN

(71) Applicant: NUTRITION & BIOSCIENCES USA 4, INC., Rochester, NY (US)

(72) Inventors: David Valdesueiro, Oegstgeest (NL); Natnael Behabtu, Oegstgeest (NL); Christian Peter Lenges, Wilmington, DE (US); Tizazu H. Mekonnen, Ontario (CA)

(73) Assignee: NUTRITION & BIOSCIENCES USA 2, INC., Wilmington, DE (US)

( * ) Notice: Subject to any disclaimer, the term of this patent is extended or adjusted under 35 U.S.C. 154(b) by 138 days.

(21) Appl. No.: 18/727,396

(22) PCT Filed: Jan. 9, 2023

(86) PCT No.: PCT/US2023/060304
§ 371 (c)(1),
(2) Date: Jul. 9, 2024

(87) PCT Pub. No.: WO2023/137258
PCT Pub. Date: Jul. 20, 2023

(65) Prior Publication Data
US 2025/0092606 A1 Mar. 20, 2025

Related U.S. Application Data

(60) Provisional application No. 63/324,295, filed on Mar. 28, 2022, provisional application No. 63/299,202,
(Continued)

(51) Int. Cl.
*D21H 19/20* (2006.01)
*C09D 7/65* (2018.01)
(Continued)

(52) U.S. Cl.
CPC ............ *D21H 19/20* (2013.01); *D21H 19/24* (2013.01); *C09D 7/65* (2018.01); *C09D 107/02* (2013.01)

(58) Field of Classification Search
CPC ........ D21H 19/20; D21H 19/24; D21H 27/10; C09D 7/65; C09D 107/02; C09D 105/00
See application file for complete search history.

(56) References Cited

U.S. PATENT DOCUMENTS 3,345,200 A 10/1967 Justice et al.
6,958,154 B2 10/2005 Andolino Brandt et al.
(Continued)

FOREIGN PATENT DOCUMENTS

CN 114761439 B * 1/2024 ............ A23B 2/746
CN 115052905 B * 6/2024 ............... C08L 5/00
(Continued)

OTHER PUBLICATIONS

Idibi et al., in "Sustainable barrier paper coating based on alpha-1,3 glucan and natural rubber latex," Carbohydrate Polymers, 282 (2022) 119121, pp. 1-12. (Year: 2022).*
(Continued)

*Primary Examiner* — Jose A Fortuna

(57) ABSTRACT

Compositions herein comprise a cellulose substrate. At least a portion of the cellulose substrate is coated with a layer of a coating composition that comprises at least (i) rubber or other diene-based elastomer, and (ii) water-insoluble alpha-glucan. At least about 50% of the glycosidic linkages of the water-insoluble alpha-glucan are alpha-1,3 linkages.

13 Claims, 12 Drawing Sheets

Related U.S. Application Data filed on Jan. 13, 2022, provisional application No. 63/298,813, filed on Jan. 12, 2022.

(51) Int. Cl.
*C09D 107/02* (2006.01)
*D21H 19/24* (2006.01)

(56) References Cited

U.S. PATENT DOCUMENTS

| | | | | |
|---|---|---|---|---|
| 7,000,000 | B1 | 2/2006 | O'Brien | |
| 7,022,352 | B2 | 4/2006 | Castro et al. | |
| 8,871,474 | B2 | 10/2014 | Payne et al. | |
| 9,688,035 | B2 | 6/2017 | Swier et al. | |
| 9,701,800 | B2 | 7/2017 | Dumberger et al. | |
| 10,260,053 | B2 | 4/2019 | Paullin et al. | |
| 10,301,604 | B2 | 5/2019 | Li et al. | |
| 11,608,388 | B2 * | 3/2023 | Kim | A61Q 17/04 |
| 11,952,435 | B2 * | 4/2024 | Kim | C09D 7/65 |
| 12,077,640 | B2 | 9/2024 | Behabtu et al. | |
| 12,264,248 | B2 * | 4/2025 | Behabtu | B32B 33/00 |
| 12,319,753 | B2 * | 6/2025 | Kim | C08B 37/0009 |
| 12,715,981 | B2 * | 8/2026 | Kim | C08L 5/00 |
| 2011/0151224 | A1 | 6/2011 | Ha et al. | |
| 2015/0191550 | A1 | 7/2015 | Mishra et al. | |
| 2015/0232785 | A1 | 8/2015 | Paullin et al. | |
| 2015/0368594 | A1 | 12/2015 | Nagy et al. | |
| 2016/0304629 | A1 | 10/2016 | Kasat et al. | |
| 2016/0311935 | A1 | 10/2016 | Dennes et al. | |
| 2017/0204203 | A1 | 7/2017 | Massouda et al. | |
| 2017/0208823 | A1 | 7/2017 | Massouda et al. | |
| 2017/0362345 | A1 | 12/2017 | Behabtu et al. | |
| 2018/0022834 | A1 | 1/2018 | Paullin et al. | |
| 2018/0079832 | A1 | 3/2018 | Paullin et al. | |
| 2018/0119357 | A1 | 5/2018 | Behabtu et al. | |
| 2018/0230241 | A1 | 8/2018 | Johnson et al. | |
| 2018/0237816 | A1 | 8/2018 | Paullin et al. | |
| 2018/0258590 | A1 | 9/2018 | Behabtu et al. | |
| 2019/0153674 | A1 * | 5/2019 | Behabtu | C08L 5/02 |
| 2019/0185893 | A1 | 6/2019 | Guan et al. | |
| 2019/0202942 | A1 | 7/2019 | Lu et al. | |
| 2019/0309096 | A1 | 10/2019 | Lu et al. | |
| 2020/0165360 | A1 | 5/2020 | Behabtu et al. | |
| 2020/0181370 | A1 | 6/2020 | Behabtu et al. | |
| 2021/0130504 | A1 * | 5/2021 | Kim | A61K 47/36 |
| 2022/0228321 | A1 * | 7/2022 | Behabtu | D06M 15/03 |
| 2023/0235097 | A1 | 7/2023 | Adelman et al. | |
| 2023/0383014 | A1 * | 11/2023 | Kim | D21H 17/24 |
| 2024/0239921 | A1 * | 7/2024 | Tong | C08J 3/005 |
| 2024/0294737 | A1 * | 9/2024 | Kim | C08B 37/0009 |
| 2024/0417489 | A1 * | 12/2024 | Kim | A23B 7/154 |
| 2025/0092606 | A1 * | 3/2025 | Valdesueiro | D21H 19/24 |

FOREIGN PATENT DOCUMENTS

| | | | | | |
|---|---|---|---|---|---|
| JP | 7849032 | B2 * | 4/2026 | | A23B 2/746 |
| WO | 2017/074859 | A1 | 5/2017 | | |
| WO | WO-2017074862 | A1 * | 5/2017 | | C08B 37/0009 |
| WO | WO-2018200437 | A1 * | 11/2018 | | C08L 5/00 |
| WO | WO-2020131711 | A1 * | 6/2020 | | C08L 5/00 |
| WO | WO-2021092228 | A1 * | 5/2021 | | C08L 5/00 |
| WO | WO-2022235655 | A1 * | 11/2022 | | C08B 37/0009 |
| WO | WO-2023137258 | A1 * | 7/2023 | | D21H 19/24 |

OTHER PUBLICATIONS

Azin Adibi et al., in "Sustainable barrier paper coating based on alpha-1,3 glucan and natural rubber latex," Carbohydrate Polymers, 282, 1191121, pp. 1-12 (Year: 2022).*

International Preliminary Report on Patentability for PCT/US2023/060304 issued Jun. 20, 2024.

Cooke et al, 1992, Carbohydr. Res. 227:103-112.

Salmén et al., "The Swelling Ability of Pulp Fibres", In the Fundamentals of Papermaking Materials, Trans. of the XIth Fund. Res. Symp. Cambridge, CF. Baker, ed., pp. 683-701, 1997.

* cited by examiner

PAPER COATING COMPOSITIONS COMPRISING RUBBER AND INSOLUBLE ALPHA-GLUCAN

This application claims the benefit of U.S. Provisional Appl. Nos. 63/298,813 (filed Jan. 12, 2022), 63/299,202 (filed Jan. 13, 2022) and 63/324,295 (filed Mar. 28, 2022), which are each incorporated herein by reference in their entirety.

FIELD

The present disclosure is in the field of polysaccharides. For example, the disclosure pertains to paper coating compositions comprising rubber and insoluble alpha-glucan having alpha-1,3 glycosidic linkages.

BACKGROUND

Driven by a desire to use polysaccharides in various applications, researchers have explored for polysaccharides that are biodegradable and that can be made economically from renewably sourced feedstocks. One such polysaccharide is alpha-1,3-glucan, an insoluble glucan polymer characterized by having alpha-1,3-glycosidic linkages. This polymer has been prepared, for example, using a glucosyltransferase enzyme isolated from *Streptococcus salivarius* (Simpson et al., *Microbiology* 141:1451-1460, 1995). Also for example, U.S. Pat. No. 7,000,000 disclosed the preparation of a spun fiber from enzymatically produced alpha-1,3-glucan. Various other glucan materials have also been studied for developing new or enhanced applications. For example, U.S. Patent Appl. Publ. No. 2015/0232819 discloses enzymatic synthesis of several insoluble glucans having mixed alpha-1,3 and -1,6 linkages.

The packaging industry utilizes many types of coating compositions for various substrates, including cellulosic substrates such as paper, depending upon their final use. In some processes, paper surfaces can be coated with a polymer (e.g., polyethylene) or treated with finishes such as fluorocarbon polymers. However, paper coated with synthetic polymers tends to be difficult to recycle or compost. There is a continuing need for paper material that is recyclable and/or compostable, and that is made from renewable resources. Moreover, there remains a need for such paper material that has good barrier properties, such as against oil/grease, oxygen, or water/vapor transfer, while also exhibiting strength and flexibility. Described herein are paper coating compositions that address this need.

SUMMARY

In one embodiment, the present disclosure concerns a composition comprising a cellulose substrate, wherein at least a portion of the cellulose substrate is coated with at least one layer of a coating composition that comprises at least (i) rubber or other diene-based elastomer, and (ii) an insoluble alpha-glucan, wherein at least about 50% of the glycosidic linkages of the alpha-glucan are alpha-1,3 linkages.

DETAILED DESCRIPTION

Figure 1:
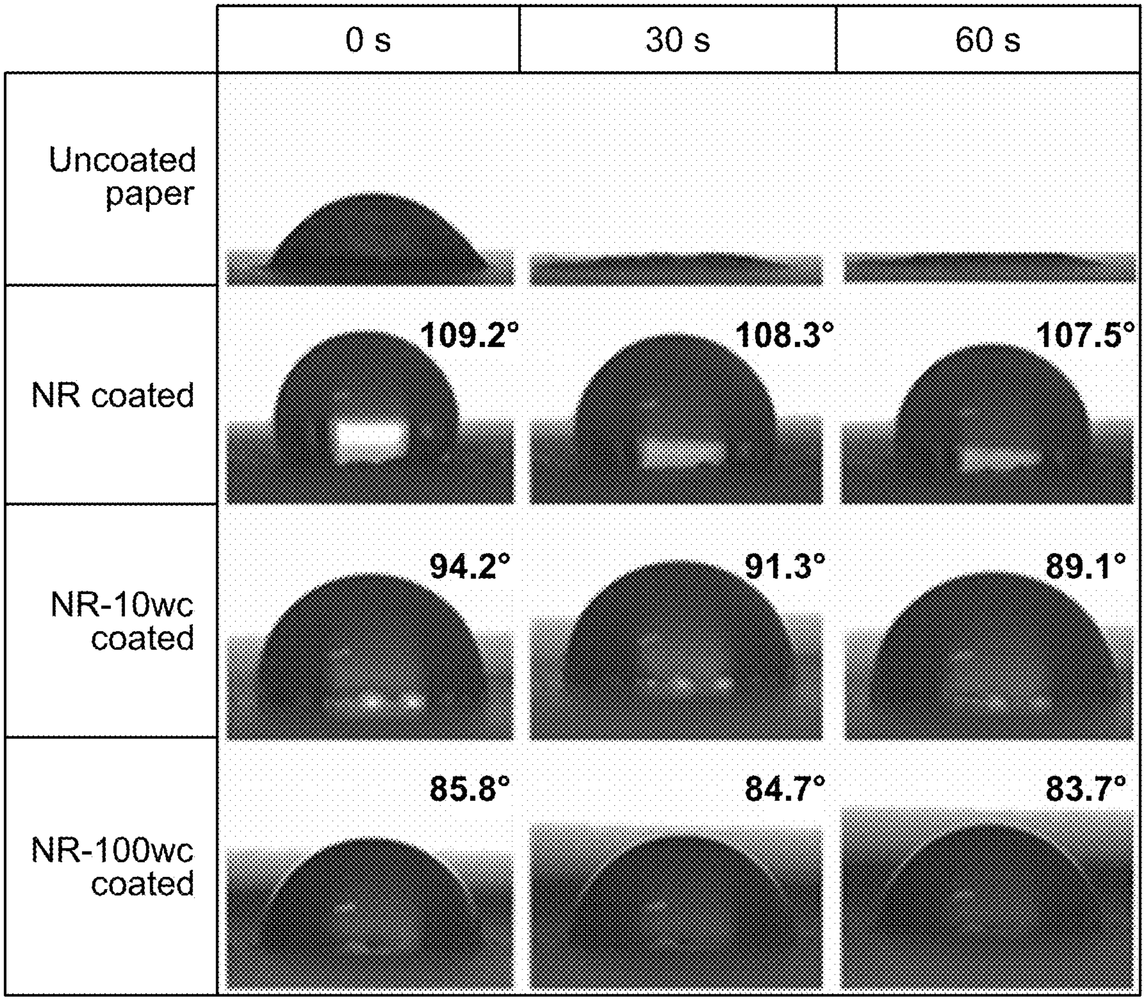
FIG. 1: Contact angle analysis of uncoated paper and coated papers. Refer to Example 2.
Figure 2A:
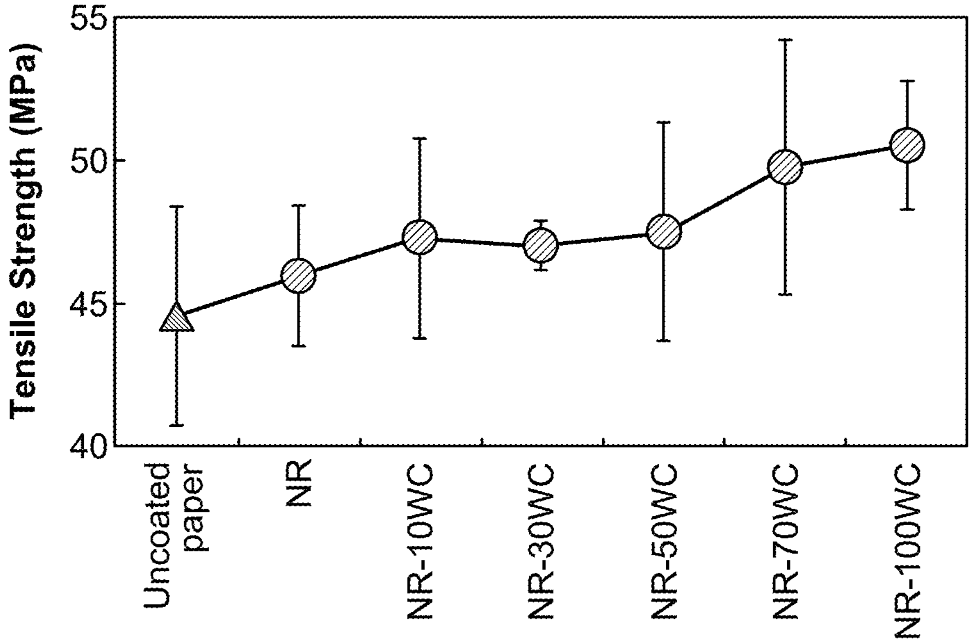
FIG. 2: Measurements of dry tensile strength (panel [a]), dry elastic modulus (panel [b]), wet tensile strength (panel [c]), and wet elastic modulus (panel [d]) of uncoated paper and paper coated with NR alone or NR with alpha-1,3-glucan. In panels (c) and (d), the first bar and second bar for each paper sample is the measurement taken after, respectively, a 30 second or 1 minute immersion in water. Refer to Example 2.
Figure 2B:
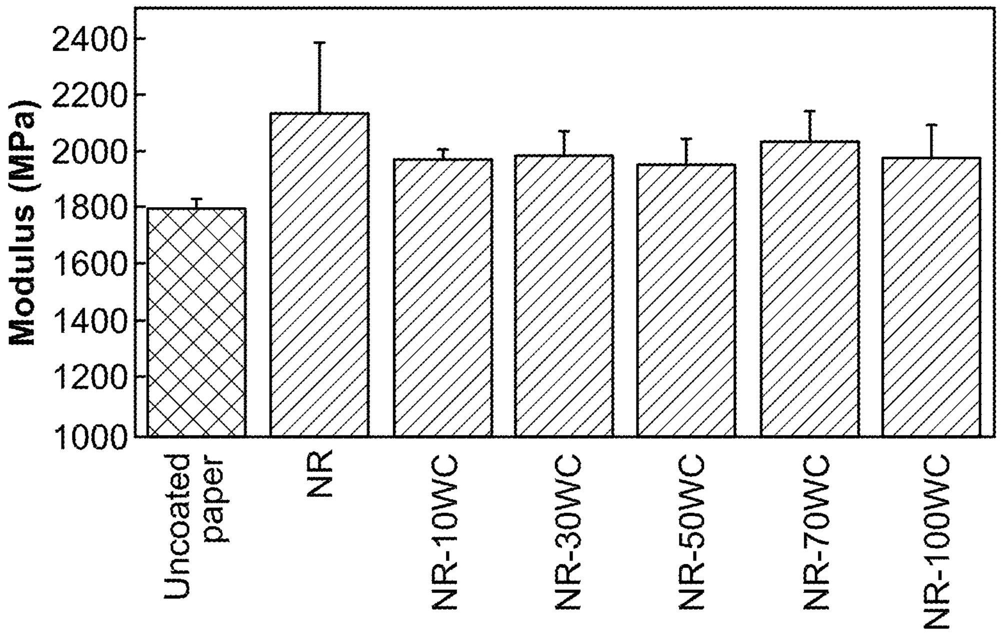
Figure 2C:
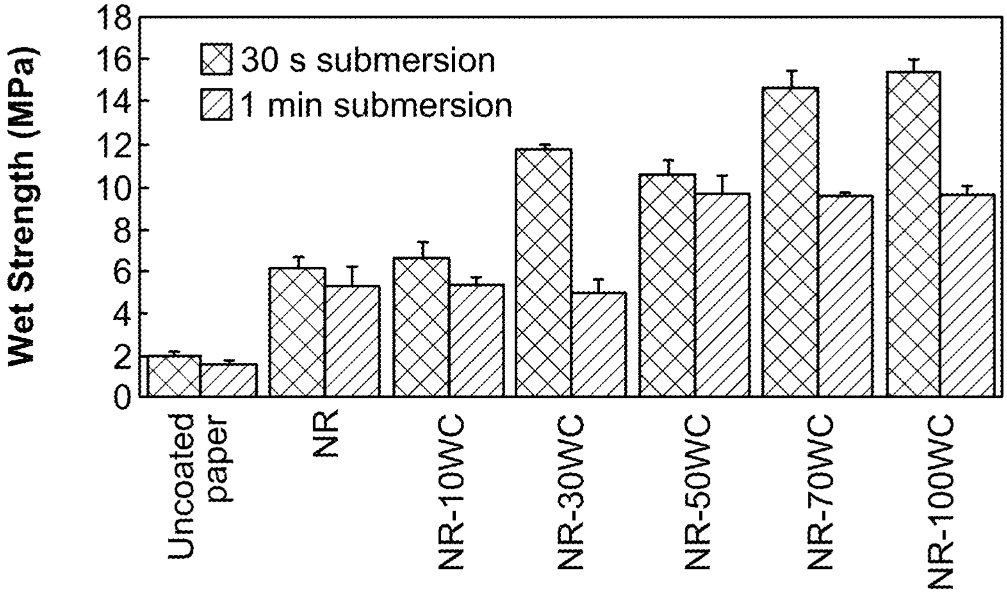
Figure 2D:
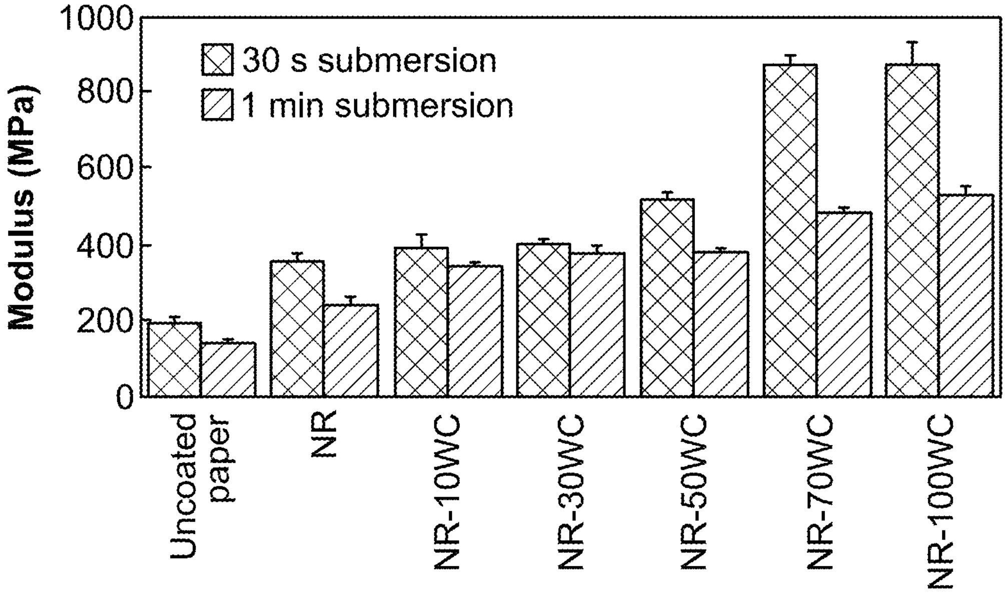
Figure 3A:
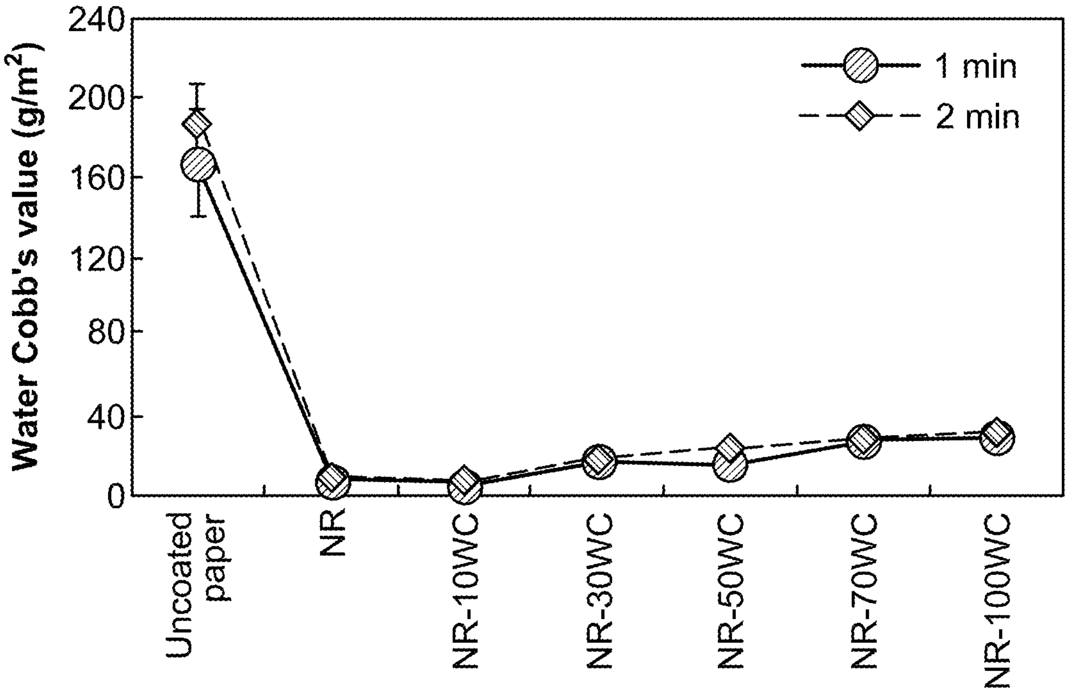
FIG. 3: Measurements of water Cobb values (panel [a]), oil Cobb values (panel [b]), water vapor permeability (WVP, panel [c]), and oxygen permeability (OP, panels [d] and [e]) of uncoated paper and paper coated with NR alone or NR with alpha-1,3-glucan. Panel (e) shows the OP of a coating having NR and about 33 wt % alpha-1,3-glucan (i.e., NR-50wc) as a function of relative humidity. Refer to Example 2.
Figure 3B:
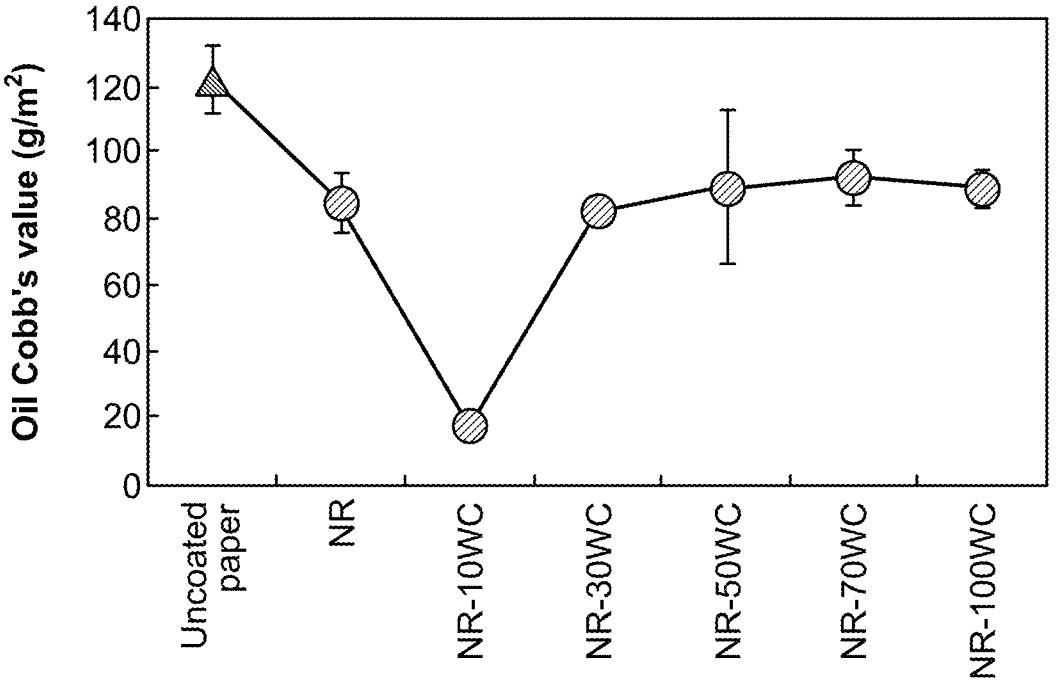
Figure 3C:
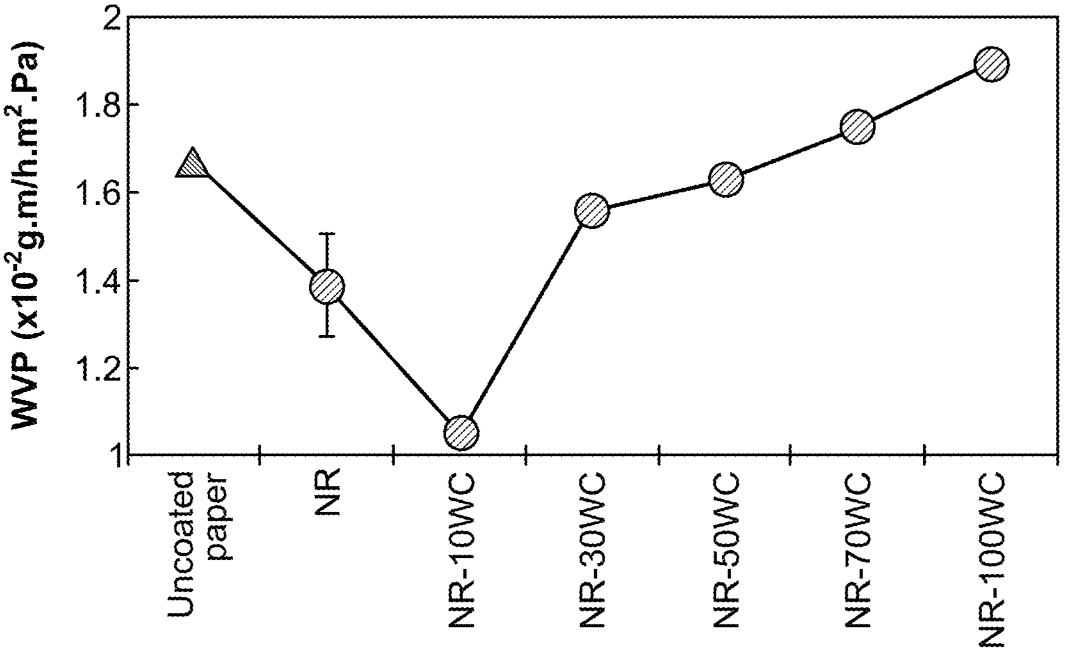
Figure 3D:
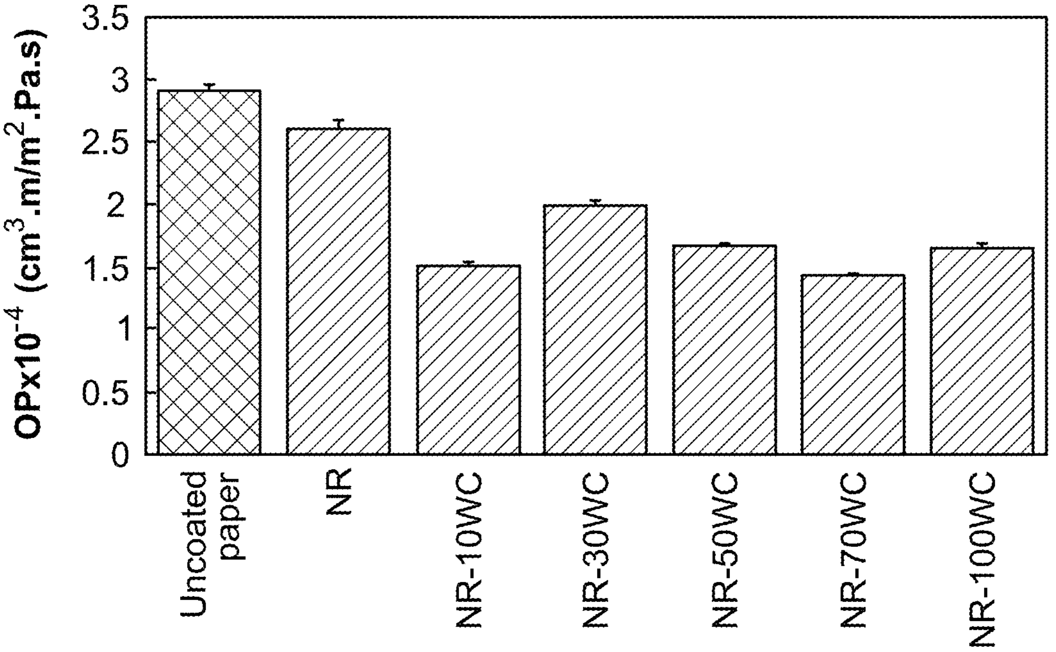
Figure 3E:
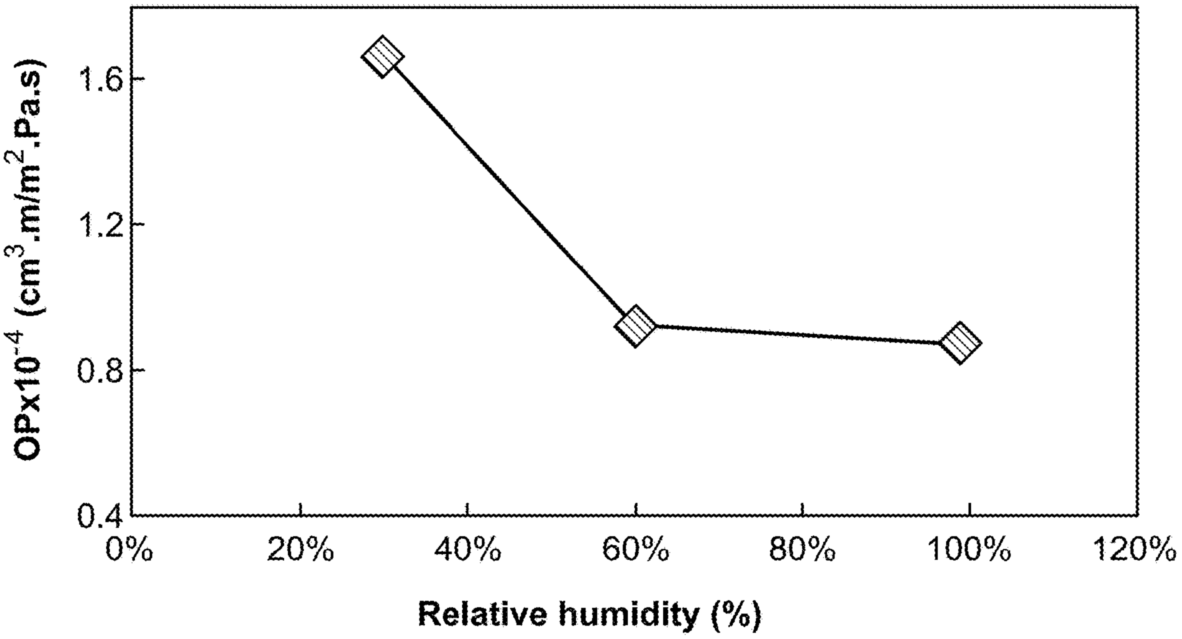

The disclosures of all cited patent and non-patent literature are incorporated herein by reference in their entirety.

Unless otherwise disclosed, the terms "a" and "an" as used herein are intended to encompass one or more (i.e., at least one) of a referenced feature.

Where present, all ranges are inclusive and combinable, except as otherwise noted. For example, when a range of "1 to 5" (i.e., 1-5) is recited, the recited range should be construed as including ranges "1 to 4", "1 to 3", "1-2", "1-2 & 4-5", "1-3 & 5", and the like. The numerical values of the various ranges in the present disclosure, unless expressly indicated otherwise, are stated as approximations as though the minimum and maximum values within the stated ranges were both proceeded by the word "about". In this manner, slight variations above and below the stated ranges can typically be used to achieve substantially the same results as values within the ranges. Also, the disclosure of these ranges is intended as a continuous range including each and every value between the minimum and maximum values.

It is intended that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

It is to be appreciated that certain features of the present disclosure, which are, for clarity, described above and below in the context of aspects/embodiments, may also be provided in combination in a single element. Conversely, various features of the disclosure that are, for brevity, described in the context of a single aspect/embodiment, can also be provided separately or in any sub-combination.

A "glucan" herein is a type of polysaccharide that is a polymer of glucose (polyglucose). A glucan can be comprised of, for example, about, or at least about, 90%, 91%, 92%, 93%, 94%, 95%, 96%, 97%, 98%, 99%, or 100% by weight glucose monomeric units. An example of a glucan herein is alpha-glucan.

The terms "alpha-glucan", "alpha-glucan polymer" and the like are used interchangeably herein. An alpha-glucan is a polymer comprising glucose monomeric units linked together by alpha-glycosidic linkages. In typical aspects, the glycosidic linkages of an alpha-glucan herein are about, or at least about, 80%, 81%, 82%, 83%, 84%, 85%, 86%, 87%, 88%, 89%, 90%, 91%, 92%, 93%, 94%, 95%, 96%, 97%, 98%, 99%, or 100% alpha-glycosidic linkages. An example of an alpha-glucan polymer herein is alpha-1,6-glucan.

The term "saccharide" and other like terms herein refer to monosaccharides and/or disaccharides/oligosaccharides, unless otherwise noted. A "disaccharide" herein refers to a carbohydrate having two monosaccharides joined by a glycosidic linkage. An "oligosaccharide" herein can refer to a carbohydrate having 3 to 15 monosaccharides, for example, joined by glycosidic linkages. An oligosaccharide can also be referred to as an "oligomer". Monosaccharides (e.g., glucose and/or fructose) comprised within disaccharides/oligosaccharides can be referred to as "monomeric units", "monosaccharide units", or other like terms.

The terms "alpha-1,3-glucan", "poly alpha-1,3-glucan", "alpha-1,3-glucan polymer" and the like are used interchangeably herein. Alpha-1,3-glucan is an alpha-glucan comprising glucose monomeric units linked together by glycosidic linkages, wherein at least about 50% of the glycosidic linkages are alpha-1,3. Alpha-1,3-glucan in some aspects comprises about, or at least about, 90%, 95%, or 100% alpha-1,3 glycosidic linkages. Most or all of the other linkages, if present, in alpha-1,3-glucan herein typically are alpha-1,6, though some linkages may also be alpha-1,2 and/or alpha-1,4. Alpha-1,3-glucan herein is typically water-insoluble.

The terms "dextran", "dextran polymer", "dextran molecule", "alpha-1,6-glucan" and the like in some aspects herein refer to a water-soluble alpha-glucan comprising at least 50%, 60%, 70%, 80%, 90%, 95%, 96%, 97%, 98%, 99%, or 99.5% alpha-1,6 glycosidic linkages (with the balance of the linkages typically being all or mostly alpha-1,3).

The term "copolymer" herein refers to a polymer comprising at least two different types of alpha-glucan, such as dextran and alpha-1,3-glucan.

The terms "graft copolymer", "branched copolymer" and the like herein generally refer to a copolymer comprising a "backbone" (or "main chain") and one or more side chains branching from the backbone. The side chains are structurally distinct from the backbone.

Examples of graft copolymers herein are "dextran-alpha-1,3-glucan graft copolymers" (and like terms) that comprise a backbone comprising dextran, and one or more side chains of alpha-1,3-glucan. A backbone in some aspects can itself be a branched dextran as disclosed herein; the addition of alpha-1,3-glucan side chains to such a backbone (thereby forming a graft copolymer herein) can be, for example, via enzymatic extension from non-reducing ends presented by short branches (alpha-1,2, -1,3, or -1,4 branch, each typically comprised of a single glucose monomer; i.e., pendant glucose). Short branches (that can be enzymatically extended into an alpha-1,3-glucan side chain) can be present on an otherwise linear or mostly linear dextran, or can be present on a branching dextran. In some aspects, alpha-1,3-glucan can also be synthesized from non-reducing ends of dextran main chains, such as in embodiments in which the dextran backbone is linear or mostly linear, or embodiments in which the dextran backbone is branching (e.g., dendritic, or not dendritic [branches do not emanate from a core] but has branch-on-branch structure); such alpha-1,3-glucan is not, technically-speaking, a side chain to the dextran, but rather an extension from the dextran main chain(s).

An "alpha-1,2 branch" (and like terms) as referred to herein typically comprises a glucose that is alpha-1,2-linked to a dextran backbone; thus, an alpha-1,2 branch herein can also be referred to as an alpha-1,2,6 linkage. An alpha-1,2 branch herein typically has one glucose group (can optionally be referred to as a pendant glucose).

An "alpha-1,3 branch" (and like terms) as referred to herein typically comprises a glucose that is alpha-1,3-linked to a dextran backbone; thus, an alpha-1,3 branch herein can also be referred to as an alpha-1,3,6 linkage. An alpha-1,3 branch herein typically has one glucose group (can optionally be referred to as a pendant glucose).

An "alpha-1,4 branch" (and like terms) as referred to herein typically comprises a glucose that is alpha-1,4-linked to a dextran backbone; thus, an alpha-1,4 branch herein can also be referred to as an alpha-1,4,6 linkage. An alpha-1,4 branch herein typically has one glucose group (can optionally be referred to as a pendant glucose).

The percent branching in an alpha-glucan herein refers to that percentage of all the linkages in the alpha-glucan that represent branch points. For example, the percent of alpha-1,2 branching in an alpha-glucan herein refers to that percentage of all the linkages in the glucan that represent alpha-1,2 branch points and/or alpha-1,3 branch points. Except as otherwise noted, linkage percentages disclosed herein are based on the total linkages of an alpha-glucan, or the portion of an alpha-glucan for which a disclosure specifically regards.

The terms "linkage", "glycosidic linkage", "glycosidic bond" and the like refer to the covalent bonds connecting the sugar monomers within a saccharide compound (oligosaccharides and/or polysaccharides). Examples of glycosidic linkages include 1,6-alpha-D-glycosidic linkages (herein also referred to as "alpha-1,6" linkages), 1,3-alpha-D-glycosidic linkages (herein also referred to as "alpha-1,3" linkages), 1,4-alpha-D-glycosidic linkages (herein also referred to as "alpha-1,4" linkages), and 1,2-alpha-D-glycosidic linkages (herein also referred to as "alpha-1,2" linkages).

The glycosidic linkage profile of an alpha-glucan can be determined using any method known in the art. For example, a linkage profile can be determined using methods using nuclear magnetic resonance (NMR) spectroscopy (e.g., $^{13}C$ NMR and/or $^{1}H$ NMR). These and other methods that can be used are disclosed in, for example, *Food Carbohydrates: Chemistry, Physical Properties, and Applications* (S. W. Cui, Ed., Chapter 3, S. W. Cui, Structural Analysis of Polysaccharides, Taylor & Francis Group LLC, Boca Raton, FL, 2005), which is incorporated herein by reference.

The "molecular weight" of an alpha-glucan herein can be represented as weight-average molecular weight (Mw) or number-average molecular weight (Mn), the units of which are in Daltons (Da) or grams/mole. Alternatively, molecular weight can be represented as DPw (weight average degree of polymerization) or DPn (number average degree of polymerization). The molecular weight of smaller alpha-glucan polymers such as oligosaccharides can optionally be provided as "DP" (degree of polymerization), which simply refers to the number of monomers comprised within the alpha-glucan; "DP" can also characterize the molecular weight of a polymer on an individual molecule basis. Various means are known in the art for calculating these various molecular weight measurements such as with high-pressure liquid chromatography (HPLC), size exclusion chromatography (SEC), or gel permeation chromatography (GPC).

As used herein, Mw can be calculated as $Mw=\Sigma NiMi^2/\Sigma NiMi$; where Mi is the molecular weight of an individual chain i and Ni is the number of chains of that molecular weight. Besides SEC, the Mw of a polymer can be determined by other techniques such as static light scattering, mass spectrometry, MALDI-TOF (matrix-assisted laser desorption/ionization time-of-flight), small angle X-ray or neutron scattering, or ultracentrifugation. As used herein, Mn can be calculated as $Mn=\Sigma NiMi/\Sigma Ni$ where Mi is the molecular weight of a chain i and Ni is the number of chains of that molecular weight. Besides SEC, the Mn of a polymer can be determined by various colligative property methods such as vapor pressure osmometry, end-group determination by spectroscopic methods such as proton NMR, proton FTIR, or UV-Vis. As used herein, DPn and DPw can be calculated from Mw and Mn, respectively, by dividing them by molar mass of the one monomer unit $M^1$. In the case of unsubstituted glucan polymer, $M_1=162$.

The terms "particle", "particulate" and like terms are interchangeably used herein, and refers to the smallest identifiable unit in a particulate system. The term "particulated" and like terms can be used to characterize particles of insoluble alpha-glucan herein. Particle size in some aspects can refer to particle diameter and/or the length of the longest particle dimension. The average size can be based on the average of diameters and/or longest particle dimensions of at least 50, 100, 500, 1000, 2500, 5000, or 10000 or more particles, for example. Particle size herein can be measured by a process comprising light scattering or electrical impedance change (e.g., using a Coulter Counter), for example, such as described in any of U.S. Pat. Nos. 6,091,492, 6,741,350, or 9,297,737 (each incorporated herein by reference). Particle size and/or distributions can be as measured for particles comprised in an aqueous dispersion, for example. Particle size herein can optionally be expressed by a "$D_{10}$", "$D_{50}$", "$D_{90}$", etc. value; for example, a $D_{50}$ value is the diameter for which 50% by weight of the particles in a composition (e.g., dispersion) have a diameter under that diameter, and 50% by weight of the particles have a diameter greater than that diameter.

The term "fibrids", "glucan fibrids", "fibrillated glucan" and the like as used herein can, in some aspects, refer to nongranular, fibrous, or film-like insoluble alpha-glucan particles with at least one of their three dimensions being of minor magnitude relative to the largest dimension. In some aspects, a glucan fibrid can have a fiber-like and/or a sheet-like structure with a relatively large surface area when compared to a glucan fiber. The surface area of fibrids herein can be, for example, about 5 to 50 $meter^2$/gram of material, with the largest dimension of about 10 to 1000 microns and the smallest dimension of 0.05 to 0.25 microns (aspect ratio of largest to smallest dimension of 40 to 20000).

The terms "plate", "platy", "plate-like", "flakey" and like terms herein characterize the shape of insoluble alpha-glucan particles in some aspects. Particles having this shape herein generally are flat (more two-dimensional than three-dimensional), as opposed to being spherical, cylindrical, fibrillar, fibrous, rod-like, cubic, acicular, spongey/porous, lamellar, or of some other shape. Particles in some aspects can optionally be referred to as "plates", "platelets", and like terms, and/or collectively as "microcrystalline glucan" and like terms. Yet, in some aspects, particles are not in the form of plates, but rather are spherical.

The terms "crystalline", "crystalline solid", "crystal" and like terms herein refer to a solid material whose constituents are arranged in a regularly ordered structure forming a lattice; such material typically is a portion of a larger composition having both crystalline and amorphous regions. An "amorphous" material is non-crystalline in that its constituents are not organized in a definite lattice pattern, but rather are randomly organized. Crystalline materials, but not amorphous materials, usually have a characteristic geometric shape (e.g., plate). The terms "crystallinity", "crystallinity index" (CI), "degree of crystallinity" and the like herein refer to the fractional amount (mass fraction or volume fraction) of an insoluble alpha-glucan that is crystalline, and can be referred to in decimal or percentage form (e.g., a crystallinity of 0.65 corresponds to a crystallinity of 65%). This fractional amount is of a total amount or volume that includes the amorphous content of the insoluble alpha-glucan. Crystallinity herein can be as measured using techniques such as differential scanning calorimetry (DSC), X-ray diffraction (XRD), small angle X-ray scattering (SAXS), infrared spectroscopy, and/or density measurements according to, for example, Struszczyk et al. (1987, *J. Appl. Polym. Sci.* 33:177-189), U.S. Patent Appl. Publ. Nos. 2015/0247176, 2010/0233773, or 2015/0152196, or International Patent Appl. Publ. No. WO2018/081263, which are all incorporated herein by reference.

The terms "aqueous liquid", "aqueous fluid", "aqueous conditions", "aqueous reaction conditions", "aqueous setting", "aqueous system" and the like as used herein can refer to water or an aqueous solution. An "aqueous solution" herein can comprise one or more dissolved salts, where the maximal total salt concentration can be about 3.5 wt % in some aspects. Although aqueous liquids herein typically comprise water as the only solvent in the liquid, an aqueous liquid can optionally comprise one or more other solvents (e.g., polar organic solvent) that are miscible in water. Thus, an aqueous solution can comprise a solvent having at least about 10 wt % water.

An "aqueous composition" herein has a liquid component that comprises about, or at least about, 10, 20, 30, 40, 50, 60, 70, 80, 90, 95, 99, or 100 wt % water, for example. Examples of aqueous compositions include some mixtures, solutions, dispersions (e.g., colloidal dispersions), suspensions and emulsions, for example.

As used herein, the term "colloidal dispersion" refers to a heterogeneous system having a dispersed phase and a dispersion medium, i.e., microscopically dispersed insoluble particles are suspended throughout another substance (e.g., an aqueous composition such as water or aqueous solution). An example of a colloidal dispersion herein is a hydrocolloid. All, or a portion of, the particles of a colloidal dispersion such as a hydrocolloid can comprise insoluble alpha-glucan as presently disclosed. The terms "dispersant" and "dispersion agent" are used interchangeably herein to refer to a material that promotes the formation and/or stabilization of a dispersion. "Dispersing" herein refers to the act of preparing a dispersion of a material in an aqueous liquid. As used herein, the term "latex" (and like terms) refers to a dispersion of one or more types of polymer particles in water or aqueous solution; typically, at least particles herein are in a latex composition as a dispersed polymer component. In some aspects, a colloidal dispersion herein comprises water, rubber and insoluble alpha-glucan, where the rubber and alpha-glucan are dispersed throughout the water. Yet, in some aspects, a colloidal dispersion comprises insoluble alpha-glucan dispersed throughout rubber; such a dispersion can be made by drying away most or all of the water that is present in an aqueous dispersion comprising rubber and insoluble alpha-glucan.

An alpha-glucan herein that is “insoluble”, “aqueous-insoluble”, “water-insoluble” (and like terms) (e.g., alpha-1,3-glucan with a DP of 8 or higher) herein does not dissolve (or does not appreciably dissolve) in water or other aqueous conditions, optionally where the aqueous conditions are at a pH of 4-9 (e.g., pH 6-8) and/or temperature of about 1 to 130 °C. (e.g., 20-25 °C). In some aspects, less than 1.0 gram (e.g., no detectable amount) of an aqueous-insoluble alpha-glucan herein dissolves in 1000 milliliters of such aqueous conditions (e.g., water at 23 °C). In contrast, glucans such as certain oligosaccharides herein that are “soluble”, “aqueous-soluble”, “water-soluble” and the like (e.g., alpha-1,3-glucan with a DP less than 8) appreciably dissolve under these conditions.

A “dope solution”, “dope”, “caustic solution”, “basic solution”, “alkaline solution” and the like herein refer to a solution (typically aqueous with pH≥11) in which, at least, a water-insoluble alpha-glucan (e.g., being insoluble in aqueous solution of pH 4-9) is dissolved.

The terms “film”, “sheet” and like terms herein refer to a generally thin, continuous material. A film can be comprised as a layer or coating on a material, or can be alone (e.g., not attached to a material surface; free-standing). A “coating” (and like terms) as used herein refers to a layer covering a surface of a material. The term “uniform thickness” as used to characterize a film or coating herein can refer to a contiguous area that (i) is at least 20% of the total film/coating area, and (ii) has a standard deviation of thickness of less than about 50 nm, for example. The term “continuous layer” means a layer of a composition applied to at least a portion of a substrate, wherein a dried layer of the composition covers ≥99% of the surface to which it has been applied and having less than 1% voids in the layer that expose the substrate surface. The ≥99% of the surface to which the layer has been applied excludes any area of the substrate to which the layer has not been applied. A coating herein can make a continuous layer in some aspects. A “coating composition” (and like terms) herein refers to all the solid components that form a layer on a substrate (or that can form a film or sheet), such as rubber and insoluble alpha-glucan herein, and optionally, pigment, surfactant, dispersing agent, binder, crosslinking agent, and/or other additives. Optionally, a coating herein has little (e.g., less than 1, 0.5, 0.1, 0.05, or 0.01 wt %) or no pigment and/or other additives. A coating composition as applied to a substrate herein typically is dry (has been dried).

The terms “cellulose substrate”, “cellulose-based substrate” and other like terms herein typically refer to material comprising about, or at least about, 80% by weight cellulose fiber. Examples of a cellulose substrate include paper, woven products and non-woven products.

The term “woven product” and like terms herein refer to a product formed by weaving, braiding, interlacing, or otherwise intertwining threads or fibers in an organized, consistent, and/or repeating manner.

The terms “non-woven”, “non-woven product”, “non-woven web” and the like herein refer to a web of individual fibers or filaments that are interlaid, typically in a random or unidentifiable manner. This contrasts with a knitted or woven fabric, which has an identifiable network of fibers or filaments. In some aspects, a non-woven product comprises a non-woven web that is bound or attached to another material such as a substrate or backing. A non-woven in some aspects can further contain a binder or adhesive (strengthening agent) that binds adjacent non-woven fibers together. A non-woven binder or adhesive agent can be applied to the non-woven in the form of a dispersion/latex, solution, or solid, for example, and then the treated non-woven is typically dried.

The terms “fabric”, “textile”, “cloth” and the like are used interchangeably herein to refer to a woven material having a network of natural and/or artificial fibers. Such fibers can be in the form of thread or yarn, for example. However, in some aspects, a fabric can comprise non-woven fibers.

The terms “rubber”, “rubber ingredient”, “rubber component” and the like herein can be used interchangeably and refer to a polyisoprene polymer, which is an elastic material. Polyisoprene typically has a molecular weight of 100000 to 1000000 Daltons. Rubber herein can be natural rubber (NR), which typically is derived from latex sap of certain trees (e.g., trees of the genera *Hevea* and *Ficus*), or synthetic rubber. Rubber can optionally be characterized as a type of diene-based elastomer. While rubber and/or other diene-based elastomers generally are not vulcanized at any step herein of preparing a coated substrate, vulcanization can be used in some aspects. The terms “compounded rubber”, “compounded elastomer” and the like herein refer to rubber or any other diene-based elastomer that has been blended or mixed with at least one additional ingredient or material.

The terms “vulcanize”, “cure” and the like herein can be used interchangeably and refer to using sulfur- or peroxide-based agents to cure rubber or other types of diene-based elastomers in some aspects. Typical sulfur-based agents for vulcanization include elemental sulfur, sulfur-containing resins, sulfur-olefin adducts, and cure accelerators.

The term “parts-per-hundred rubber/resin” (“phr”) herein refers to parts by weight of a respective material per 100 parts by weight of a rubber component. Optionally, any wt % value disclosed herein, such as for rubber and/or insoluble alpha-glucan, can instead be disclosed in terms of its corresponding phr value.

The terms “sequence identity”, “identity” and the like as used herein with respect to a polypeptide amino acid sequence (e.g., that of a glucosyltransferase) are as defined and determined in U.S. Patent Appl. Publ. No. 2017/0002336, which is incorporated herein by reference.

Various polypeptide amino acid sequences are disclosed herein as features of certain embodiments. Variants of these sequences that are at least about 70-85%, 85-90%, or 90%-95% identical to the sequences disclosed herein can be used or referenced. Alternatively, a variant amino acid sequence can have at least 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 99.5% identity with a sequence disclosed herein. The variant amino acid sequence has the same function/activity of the disclosed sequence, or at least about 80%, 81%, 82%, 83%, 84%, 85%, 86%, 87%, 88%, 89%, 90%, 91%, 92%, 93%, 94%, 95%, 96%, 97%, 98%, or 99% of the function/activity of the disclosed sequence.

A composition herein such as a coating composition, or layer or film/sheet thereof, that is “dry” or “dried” typically has less than about 6, 5, 4, 3, 2, 1, 0.5, or 0.1 wt % water comprised therein.

The term "viscosity" as used herein refers to the measure of the extent to which a fluid (aqueous or non-aqueous) resists a force tending to cause it to flow. Various units of viscosity that can be used herein include centipoise (cP, cps) and Pascal-second (Pa·s), for example. A centipoise is one one-hundredth of a poise; one poise is equal to 0.100 $kg \cdot m^{-1} \cdot s^{-1}$. Viscosity can be reported as "intrinsic viscosity" (IV, $\eta$, units of dL/g) in some aspects; this term refers to a measure of the contribution of a glucan polymer to the viscosity of a liquid (e.g., solution) comprising the glucan polymer. IV measurements herein can be obtained, for example, using any suitable method such as disclosed in U.S. Pat. Appl. Publ. Nos. 2017/0002335, 2017/0002336, or 2018/0340199, or Weaver et al. (*J. Appl. Polym. Sci.* 35:1631-1637) or Chun and Park (*Macromol. Chem. Phys.* 195:701-711), which are all incorporated herein by reference. IV can be measured, in part, by dissolving glucan polymer (optionally dissolved at about 100 °C for at least 2, 4, or 8 hours) in DMSO with about 0.9 to 2.5 wt % (e.g., 1, 2, 1-2 wt %) LiCl, for example. IV herein can optionally be used as a relative measure of molecular weight.

The terms "contact angle", "wetting angle" and like terms herein refer to the angle that is formed when a droplet of water or aqueous solution is placed on a material surface and the drop forms a dome shape on the surface. The angle formed between the material surface and the line tangent to the edge of the drop is the contact angle. For instance, as a drop of water spreads across a material surface and the drop's dome becomes flatter, the contact angle becomes smaller. If the drop of water beads up on the material surface (e.g., when there is high surface tension), the drop's dome is taller and the contact angle becomes larger.

The term "relative humidity" herein refers to the amount of water vapor present in air expressed as a percentage of the amount needed for saturation at the same temperature.

The terms "percent by volume", "volume percent", "vol %", "v/v %" and the like are used interchangeably herein. The percent by volume of a solute in a solution can be determined using the formula: [(volume of solute)/(volume of solution)]×100%.

The terms "percent by weight", "weight percentage (wt %)", "weight-weight percentage (% w/w)" and the like are used interchangeably herein. Percent by weight refers to the percentage of a material on a mass basis as it is comprised in a composition, mixture, or solution.

The terms "weight/volume percent", "w/V %" and the like are used interchangeably herein. Weight/volume percent can be calculated as: ((mass [g] of material)/(total volume [mL] of the material plus the liquid in which the material is placed))×100%. The material can be insoluble in the liquid (i.e., be a solid phase in a liquid phase, such as with a dispersion), or soluble in the liquid (i.e., be a solute dissolved in the liquid).

The term "isolated" means a substance (or process) in a form or environment that does not occur in nature. A non-limiting example of an isolated substance includes any coating composition herein, or a substrate that is coated with such a composition. It is believed that the embodiments disclosed herein are synthetic/man-made (could not have been made or practiced except for human intervention/involvement), and/or have properties that are not naturally occurring.

The term "increased" as used herein can refer to a quantity or activity that is at least about 1%, 2%, 3%, 4%, 5%, 6%, 7%, 8%, 9%, 10%, 11%, 12%, 13%, 14%, 15%, 16%, 17%, 18%, 19%, 20%, 50%, 100%, or 200% more than the quantity or activity for which the increased quantity or activity is being compared. The terms "increased", "elevated", "enhanced", "greater than", "improved" and the like are used interchangeably herein.

Some aspects of the present disclosure concern a composition comprising a cellulose substrate (or any other substrate), wherein at least a portion of the cellulose substrate is coated with at least one layer of a coating composition that comprises at least (i) rubber or other diene-based elastomer, and (ii) an insoluble alpha-glucan, wherein at least about 50% of the glycosidic linkages of the alpha-glucan are alpha-1,3 linkages.

In some aspects, an insoluble alpha-glucan comprises about, or at least about, 50%, 60%, 70%, 80%, 85%, 86%, 87%, 88%, 89%, 90%, 91%, 92%, 93%, 94%, 95%, 96%, 97%, 98%, 99%, 99.5%, or 100% alpha-1,3 glycosidic linkages (i.e., the alpha-glucan is an alpha-1,3-glucan). In some aspects, accordingly, an insoluble alpha-glucan has about, or less than about, 50%, 40%, 30%, 20%, 15%, 10%, 9%, 8%, 7%, 6%, 5%, 4%, 3%, 2%, 1%, 0.5%, or 0% glycosidic linkages that are not alpha-1,3. Typically, the glycosidic linkages that are not alpha-1,3 are mostly or entirely alpha-1,6. In some aspects, an insoluble alpha-glucan has no branch points or less than about 5%, 4%, 3%, 2%, or 1% branch points as a percent of the glycosidic linkages in the alpha-glucan.

The DPw, DPn, or DP of an insoluble alpha-glucan in some aspects can be about, at least about, or less than about, 10, 15, 25, 50, 75, 100, 150, 200, 300, 400, 500, 600, 700, 800, 900, 1000, 1100, 1200, 1300, 1400, 1500, 1600, 1700, 1800, 1900, 2000, 2500, 3000, 3500, or 4000. DPw, DPn, or DP can optionally be expressed as a range between any two of these values. Merely as examples, the DPw, DPn, or DP can be about 50-1600, 100-1600, 200-1600, 300-1600, 400-1600, 500-1600, 600-1600, 700-1600, 50-1250, 100-1250, 200-1250, 300-1250, 400-1250, 500-1250, 600-1250, 700-1250, 50-1000, 100-1000, 200-1000, 300-1000, 400-1000, 500-1000, 600-1000, 700-1000, 50-900, 100-900, 200-900, 300-900, 400-900, 500-900, 600-900, 700-900, 600-800, or 600-750. Merely as further examples, the DPw, DPn, or DP can be about 15-100, 25-100, 35-100, 15-80, 25-80, 35-80, 15-60, 25-60, 35-60, 15-55, 25-55, 35-55, 15-50, 25-50, 35-50, 35-45, 35-40, 40-100, 40-80, 40-60, 40-55, 40-50, 45-60, 45-55, 45-50, 15-35, 20-35, 15-30, or 20-30. Merely as further examples, the DPw, DPn, or DP can be about 100-600, 100-500, 100-400, 100-300, 200-600, 200-500, 200-400, or 200-300. In some aspects, an insoluble alpha-glucan can have a high molecular weight as reflected by high intrinsic viscosity (IV); e.g., IV can be about, or at least about, 6, 7, 8, 9, 10, 11, 12, 13, 14, 15, 16, 17, 18, 19, 20, 21, 22, 6-8, 6-7, 6-22, 6-20, 6-17, 6-15, 6-12, 10-22, 10-20, 10-17, 10-15, 10-12, 12-22, 12-20, 12-17, or 12-15 dL/g (for comparison purposes, note that the IV of insoluble alpha-glucan with at least 90% (e.g., about 99% or 100%) alpha-1,3 linkages and a DPw of about 800 has an IV of about 2-2.5 dL/g). IV herein can be as measured with insoluble alpha-glucan polymer dissolved in DMSO with about 0.9 to 2.5 wt % (e.g., 1, 2, 1-2 wt %) LiCl, for example.

An insoluble alpha-glucan herein can be as disclosed (e.g., molecular weight, linkage profile, and/or production method), for example, in U.S. Pat. Nos. 7,000,000, 8,871,474, 10,301,604, or 10,260,053, or U.S. Patent Appl. Publ. Nos. 2019/0112456, 2019/0078062, 2019/0078063, 2018/0340199, 2018/0021238, 2018/0273731, 2017/0002335, 2015/0232819, 2015/0064748, 2020/0165360, 2020/0131281, or 2019/0185893, which are each incorporated herein by reference. An insoluble alpha-glucan can be produced, for example, by an enzymatic reaction comprising at least water, sucrose and a glucosyltransferase enzyme that synthesizes the insoluble alpha-glucan. Glucosyltransferases, reaction conditions, and/or processes contemplated to be useful for producing insoluble alpha-glucan can be as disclosed in any of the foregoing references.

In some aspects, a glucosyltransferase enzyme for producing an insoluble alpha-glucan herein can comprise an amino acid sequence that is 100% identical to, or at least 90%, 91%, 92%, 93%, 94%, 95%, 96%, 97%, 98%, 98.5%, 99%, or 99.5% identical to, SEQ ID NO: 2, 4, 6, 8, 10, 12, 14, 16, 18, 20, 26, 28, 30, 34, or 59, or amino acid residues 55-960 of SEQ ID NO:4, residues 54-957 of SEQ ID NO:65, residues 55-960 of SEQ ID NO:30, residues 55-960 of SEQ ID NO:28, or residues 55-960 of SEQ ID NO:20, and have glucosyltransferase activity; these amino acid sequences are disclosed in U.S. Patent Appl. Publ. No. 2019/0078063, which is incorporated herein by reference. It is noted that a glucosyltransferase enzyme comprising SEQ ID NO:2, 4, 8, 10, 14, 20, 26, 28, 30, 34, or amino acid residues 55-960 of SEQ ID NO:4, residues 54-957 of SEQ ID NO:65, residues 55-960 of SEQ ID NO:30, residues 55-960 of SEQ ID NO:28, or residues 55-960 of SEQ ID NO: 20, can synthesize insoluble alpha-glucan comprising at least about 90% (~100%) alpha-1,3 linkages.

In some aspects, insoluble alpha-glucan can be in the form of an insoluble graft copolymer such as disclosed in Int. Patent Appl. Publ. No. WO2017/079595 or U.S. Patent Appl. Publ. Nos. 2020/0165360, 2019/0185893, or 2020/0131281, which are incorporated herein by reference. A graft copolymer can comprise dextran (as backbone) and alpha-1,3-glucan (as one or more side chains), where the latter component has been grafted onto the former component; typically, this graft copolymer is produced by using dextran or alpha-1,2- and/or alpha-1,3-branched dextran as a primer for alpha-1,3-glucan synthesis by an alpha-1,3-glucan-producing glucosyltransferase as described above. Alpha-1,3-glucan side chain(s) of an alpha-glucan graft copolymer herein can be alpha-1,3-glucan as presently disclosed. Dextran backbone of an alpha-glucan graft copolymer herein can comprise about 100% alpha-1,6 glycosidic linkages (i.e., completely linear dextran backbone), or about, or at least about, 90%, 95%, 96%, 97%, 98%, 99%, or 99.5% alpha-1,6 glycosidic linkages (i.e., substantially linear dextran backbone), and/or have a DP or DPw of about, at least about, or less than about, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 85, 90, 95, 100, 105, 110, 150, 200, 250, 300, 400, 500, 8-20, 8-30, 8-100, 8-500, 3-4, 3-5, 3-6, 3-7, 3-8, 4-5, 4-6, 4-7, 4-8, 5-6, 5-7, 5-8, 6-7, 6-8, 7-8, 90-120, 95-120, 100-120, 105-120, 110-120, 115-120, 90-115, 95-115, 100-115, 105-115, 110-115, 90-110, 95-110, 100-110, 105-110, 90-105, 95-105, 100-105, 90-100, 95-100, 90-95, 85-95, or 85-90, for example. The molecular weight of a dextran backbone in some aspects can be about, or at least about, 0.1, 0.125, 0.15, 0.175, 0.2, 0.24, 0.25, 0.5, 0.75, 1, 2, 3, 4, 5, 6, 7, 8, 9, 10, 20, 30, 40, 50, 60, 70, 80, 90, 100, 110, 120, 130, 140, 150, 160, 170, 180, 190, 200, 0.1-0.2, 0.125-0.175, 0.13-0.17, 0.135-0.165, 0.14-0.16, 0.145-0.155, 10-80, 20-70, 30-60, 40-50, 50-200, 60-200, 70-200, 80-200, 90-200, 100-200, 110-200, 120-200, 50-180, 60-180, 70-180, 80-180, 90-180, 100-180, 110-180, 120-180, 50-160, 60-160, 70-160, 80-160, 90-160, 100-160, 110-160, 120-160, 50-140, 60-140, 70-140, 80-140, 90-140, 100-140, 110-140, 120-140, 50-120, 60-120, 70-120, 80-120, 90-120, 90-110, 100-120, 110-120, 50-110, 60-110, 70-110, 80-110, 90-110, 100-110, 50-100, 60-100, 70-100, 80-100, 90-100, or 95-105 million Daltons. In some aspects, a dextran backbone (before being integrated into a graft copolymer) has been alpha-1,2- and/or alpha-1,3-branched; the percent alpha-1,2 and/or alpha-1,3 branching of a backbone of a graft copolymer herein can be about, at least about, or less than about, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 30%, 35%, 40%, 45%, 50%, 2-25%, 2-20%, 2-15%, 2-10%, 5-25%, 5-20%, 5-15%, 5-10%, 7-13%, 8-12%, 9-11%, 10-25%, 10-20%, 10-15%, 10-22%, 12-20%, 12-18%, 14-20%, 14-18%, 15-18%, or 15-17%, for example. The dextran portion of a graft copolymer herein can be as disclosed (e.g., molecular weight, linkage/branching profile, production method), for example, in U.S. Patent Appl. Publ. Nos. 2016/0122445, 2017/0218093, 2018/0282385, 2020/0165360, or 2019/0185893, which are each incorporated herein by reference. In some aspects, a dextran can be one produced in a suitable reaction comprising glucosyltransferase (GTF) 0768 (SEQ ID NO:1 or 2 of US2016/0122445), GTF 8117, GTF 6831, or GTF 5604 (these latter three GTF enzymes are SEQ ID NOs: 30, 32 and 33, respectively, of US2018/0282385), or a GTF comprising an amino acid sequence that is at least 90%, 91%, 92%, 93%, 94%, 95%, 96%, 97%, 98%, or 99% identical to the amino acid sequence of GTF 0768, GTF 8117, GTF 6831, or GTF 5604.

Insoluble alpha-glucan for use in preparing a composition of the present disclosure can be in the form of particles in some aspects. As comprised in an aqueous composition such as a dispersion (such as when mixed with a rubber latex dispersion in preparing a coating composition), about 40-60%, 40-55%, 45-60%, 45-55%, 47-53%, 48-52%, 49-51%, or 50% by weight of such insoluble alpha-glucan particles have a diameter (i.e., $D_{50}$) of about, less than about, or at least about, 1, 2, 3, 4, 5, 6, 7, 8, 9, 10, 11, 12, 13, 14, 15, 16, 17, 18, 19, 20, 21, 22, 23, 24, 25, 1-25, 1-22, 1-20, 1-18, 5-25, 5-22, 5-20, 5-18, 15-22, 15-20, 15-18, 16-22, 16-20, or 16-18 microns, for example.

Insoluble alpha-glucan herein typically does not have any chemical derivatization (e.g., etherification, esterification, phosphorylation, sulfation, oxidation, carbamation) (e.g., no substitution of hydrogens of glucan hydroxyl groups with a non-sugar chemical group). However, in some aspects, insoluble alpha-glucan can be a charged (e.g., cationic or anionic) derivative of an alpha-glucan as disclosed herein. The DoS of such a derivative typically is less than about 0.3, 0.25, 0.2, 0.15, 0.1, or 0.05. The type of derivative can be any of the foregoing derivatives (e.g., ether, ester). Typically, insoluble alpha-glucan herein is enzymatically derived in an inert vessel (typically under cell-free conditions) and is not derived from a cell wall (e.g., fungal cell wall).

Insoluble alpha-glucan of the disclosed composition can be in the form of fibrids in some aspects. The alpha-glucan of fibrids can have a linkage profile and/or molecular weight as disclosed above, for example. Alpha-glucan fibrids herein can be as disclosed and/or produced in U.S. Pat. Appl. Publ. No. 2018/0119357, for example, which is incorporated herein by reference. Fibrids herein typically comprise insoluble alpha-glucan as disclosed herein, which is non-derivatized. However, in some aspects, fibrids can comprise an insoluble, charged (e.g., cationic or anionic) derivative (e.g., ether) of an alpha-glucan as disclosed herein. The DoS of such a derivative typically is less than about 0.3, 0.25, 0.2, 0.15, 0.1, or 0.05.

A composition of the present disclosure can, in some aspects, comprise insoluble alpha-glucan that is in the form of particles having a degree of crystallinity of at least about 0.65. The degree of crystallinity (or crystallinity index [CI])

of insoluble alpha-glucan particles herein can be about, or at least about, 0.55, 0.60, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.60-0.83, 0.65-0.83, 0.67-0.83, 0.69-0.83, 0.60-0.81, 0.65-0.81, 0.67-0.81, 0.69-0.81, 0.60-0.78, 0.65-0.78, 0.67-0.78, 0.69-0.78, 0.60-0.76, 0.65-0.76, 0.67-0.76, or 0.69-0.76, for example. In general, that portion of insoluble alpha-glucan herein that is not crystalline is amorphous. Flowing from the foregoing crystallinity values, the wt % of particles that is amorphous is about, or less than about, 45%, 40%, 35%, 30%, 25%, 20%, or 15%, for example. The degree of crystallinity of alpha-glucan particles herein can be as when measured according to any suitable method, such as follows. A sample of insoluble alpha-glucan herein is dried for at least about 2 hours (e.g., 8-12 hours) in a vacuum oven set at about 55-65 °C. (e.g., 60 °C). The sample is then be packed into a stainless steel holder with a well of about 1-2 cm wide by 3-5 cm long by 3-5 mm deep, after which the holder is loaded into a suitable diffractometer (e.g., X'PERT MPD POWDER diffractometer, PANalytical B.V., The Netherlands) set in reflection mode to measure the X-ray diffraction pattern of the sample. The X-ray source is a Cu X-ray tube line source with an optical focusing mirror and a ~1/16° narrowing slit. X-rays are detected with a 1-D detector and an anti-scatter slit set at ~1/8°. Data are collected in the range of about 4 to 60 degrees of two-theta at about 0.1 degrees per step. The resulting X-ray pattern is then analyzed by subtracting a linear baseline from about 7.2 to 30.5 degrees, subtracting the XRD pattern of a known amorphous alpha-1,3-glucan sample that has been scaled to fit the data, and then fitting the remaining crystal peaks in that range with a series of Gaussian curves corresponding to known dehydrated alpha-1,3-glucan crystal reflections. The area corresponding to the crystal peaks is then divided by the total area under the baseline-subtracted curve to yield a crystallinity index. Insoluble alpha-glucan with any of the foregoing degrees of crystallinity can have a DP, DPw, or DPn of about 15 to 100 (e.g., any molecular weight disclosed herein falling in this range), for example. In some aspects, the CI of insoluble alpha-glucan particles herein can be about, or less than about, 0.6, 0.55, or 0.50; such particles typically comprise amorphous regions, which lower the CI of these particles as compared to plate particles (described below) (such particles can optionally be characterized as being fibrillar and/or striated in appearance).

At least about 80 wt % of particles of insoluble alpha-glucan having any of the foregoing CI's of 0.65 or greater can be in the form of plates, for example. In some of these aspects, about, or at least about, 60, 65, 70, 75, 80, 81, 82, 83, 84, 85, 86, 87, 88, 89, 90, 91, 92, 93, 94, 95, 96, 97, 98, 99, 60-85, 60-80, 60-75, 60-70, 65-85, 65-80, 65-75, 65-70, 70-85, 70-80, or 70-75 wt % of the particles of insoluble alpha-glucan are in the form of plates. Plates of insoluble alpha-glucan herein can be visually appreciated when viewed by electron microscopy such as TEM or SEM, for example.

In some aspects, at least about 65% by weight of insoluble alpha-glucan particles having any of the foregoing CI's of 0.65 or greater have a diameter of less than 1.0 micron. Yet, in some aspects, about, or at least about, 65%, 70%, 75%, 80%, 85%, 90%, 95%, 65-95%, 70-95%, 75-95%, 80-95%, 85-95%, 65-90%, 70-90%, 75-90%, 80-90%, 85-90%, 65-85%, 70-85%, 75-85%, or 80-85% by weight of insoluble alpha-glucan particles have a diameter of less than about 1.0 micron. In some aspects, about 40-60%, 40-55%, 45-60%, 45-55%, 47-53%, 48-52%, 49-51%, or 50% by weight of the insoluble alpha-glucan particles have a diameter of about, or less than about, 1.0, 0.9, 0.8, 0.7, 0.6, 0.5, 0.4, 0.35, 0.34, 0.32, 0.30, 0.28, 0.26, 0.25, 0.24, 0.23, 0.22, 0.21, 0.20, 0.19, 0.18, 0.17, 0.16, 0.15, 0.14, 0.13, 0.12, 0.11, 0.10, 0.10-1.0, 0.10-0.80, 0.10-0.60, 0.10-0.40, 0.10-0.35, 0.10-0.30, 0.10-0.25, 0.10-0.20, 0.15-0.35, 0.15-0.30, 0.15-0.25, or 0.15-0.20 micron. In some aspects, about 40-60%, 40-55%, 45-60%, 45-55%, 47-53%, 48-52%, 49-51%, or 50% by weight of insoluble alpha-glucan particles are aggregates of the foregoing smaller diameter particles, and have a diameter of about, less than about, or at least about, 10, 25, 50, 100, 150, 200, 250, 300, 350, 400, 450, 500, 550, 600, 10-600, 10-550, 10-500, 50-600, 50-550, 50-500, 100-600, 100-550, 100-500, 150-600, 150-550, 150-500, 200-600, 200-550, 200-500, 250-600, 250-550, or 250-500 microns. Alpha-glucan particles having any of the foregoing degrees of crystallinity can have a thickness of about 0.010, 0.015, 0.020, 0.025, 0.030, or 0.010-0.030 micron, for example; such a thickness can optionally be in conjunction with any of the foregoing diameter aspects. The foregoing particle size and/or distributions for crystalline particles herein can be as measured for particles comprised in an aqueous dispersion, and/or as measured using a light scatter technique, for example.

A coating composition herein can comprise rubber or any other diene-based elastomer. Examples of rubber herein include natural rubber (NR) and synthetic rubber. Examples of synthetic rubber herein include synthetic polyisoprene, polybutadiene, styrene-butadiene copolymer, styrene-isoprene copolymer, butadiene-isoprene copolymer, styrene-butadiene-isoprene terpolymer, ethylene propylene diene monomer rubber, hydrogenated nitrile butadiene rubber, silicone rubber, and neoprene, which are also examples of diene-based elastomers. Rubber is not diene-based in some aspects, such as silicone rubber.

A coating herein can comprise one type of rubber, or two or more different types of rubber, for example.

In some aspects, a cellulose substrate comprises about, or at least about, 80%, 82.5%, 85%, 87.5%, 90%, 91%, 92% 93%, 94%, 95%, 96%, 97%, 98%, 99%, 99.5%, or 100% by weight cellulose (typically in the form of cellulose fiber). Other components of such a substrate can optionally include hemicellulose and/or lignin. A cellulose substrate is typically porous.

A cellulose substrate in some aspects can be a paper product, woven product, or non-woven product. Examples of a paper product include paper, cardboard, paperboard, corrugated board, boxboard, and molded or compressed paper fiber. The foregoing are also examples of a composition or product herein that comprise a cellulose substrate. A composition or product herein comprising a cellulose substrate can be a packaging or container in some aspects, and typically comprises one or more of the foregoing paper products. Examples of packaging and/or containers herein include boxes (e.g., paperboard boxes, cardboard boxes, corrugated boxes, rigid boxes), chipboard, cartons (e.g., beverage carton, folding carton), bags, cups, plates, wrap/wrappers, tubes/tubing, cones, french fry holder or similar holder, tray, tissue paper, parchment paper and kraft paper. While a paper product can have one side that is covered with foil (e.g., foil-sealed), such as aluminum foil, or plastic, a paper product herein typically does not comprise such a covering. A packaging or container can be closed (e.g., sealed shut) or open (e.g., unsealed). Any of the foregoing products can optionally also be referred to as an article, as appropriate.

A coating composition as applied to a cellulose substrate herein (or any other substrate) can cover all of, or at least about 40%, 45%, 50%, 55%, 60%, 65%, 70%, 75%, 80%, 85%, 90%, 91%, 92% 93%, 94%, 95%, 96%, 97%, 98%, 99%, 99.5% of, the area of one or both sides of the substrate, for example. With regard to a composition or product that has inside and outside surfaces (e.g., box, carton, french fry holder), a coating can be on the inside surface, outside surface, or both surfaces.

In some alternative aspects, instead of being cellulose-based, a substrate that can be coated herein can comprise, or be, leather, metal, non-cellulose-based polymer or fibrous material, masonry, drywall, plaster, glass, and/or an architectural surface. Examples of non-cellulose-based polymers herein include polyamide, polyolefin, polylactic acid, polyethylene terephthalate (PET), poly(trimethylene terephthalate) (PTT), aramid, polyethylene sulfide (PES), polyphenylene sulfide (PPS), polyimide (PI), polyethylene imine (PEI), polyethylene naphthalate (PEN), polysulfone (PS), polyether ether ketone (PEEK), polyethylene, polypropylene, poly(cyclic olefins), poly(cyclohexylene dimethylene terephthalate), and poly(trimethylene furandicarboxylate) (PTF). Wood can be a substrate in another alternative aspect, for instance.

In some aspects, a composition herein such as a packaging or container holds a product, optionally wherein the coating (typically on the inner/inside surface of the packaging/container) is in contact with the product. Such a product can be an ingestible product (e.g., food product), pharmaceutical product, personal care product, home care product, or industrial product, for example. Examples of these types of products are described in U.S. Patent Appl. Publ. Nos. 2018/0022834, 2018/0237816, 2018/0230241, 20180079832, 2016/0311935, 2016/0304629, 2015/0232785, 2015/0368594, 2015/0368595, 2016/0122445, 2019/0202942, or 2019/0309096, or International Patent Appl. Publ. No. WO2016/133734, which are all incorporated herein by reference. In some aspects, a packaging or container holds, and its coating optionally is in contact with, at least one component/ingredient of an ingestible product (e.g., food product), pharmaceutical product, personal care product, home care product, or industrial product, as disclosed in any of the foregoing publications and/or as presently disclosed.

In some aspects, a product being held in the packaging/container comprises oil, grease, and/or water on its surface and the product is in contact with the inner surface of the packaging/container (optionally, the product is in contact with a layer of the coating composition if the layer happens to be located on the inner surface of the packaging/container). Typically, at least a portion of (e.g., at least about 80, 85, 90, 91, 92, 93, 94, 95, 96, 97, 98, 99, or 99.5 wt %), or all of, the oil, grease, and/or water of the product is contained inside the packaging or container. In other words, most or all of the oil, grease, and/or water is not able to transit through the packaging or container to be on the outer/exterior surface of the packaging or container.

A composition herein can be at a temperature of, and/or in an environment/system with a temperature of, about 1-50, 1-45, 1-40, 1-35, 1-30, 1-25, 1-20, 5-30, 10-30, 15-30, 20-30, 5-25, 10-25, 15-25, or 20-25 °C, for example. A composition herein can be in an environment with a relative humidity level of about, or at least about, 10%, 20%, 30%, 40%, 50%, 60%, 70%, 80%, 90%, 100%, 20%-100%, 30%-100%, 40%-100%, 50%-100%, 60%-100%, 70%-100%, 80%-100%, 20%-90%, 30%-90%, 40%-90%, 50%-90%, 60%-90%, 70%-90%, or 80%-90%, for example. An illustrative example of a composition that can be in any of the foregoing temperature and/or relative humidity conditions is a package or container herein that is holding a product.

Typically, a product herein (e.g., pharmaceutical product, personal care product, home care product, industrial product, or ingestible product such as a food product), if stored in a closed or sealed package/container herein (e.g., for 1, 2, 3, 6, 9, 12, 18, 24, 30, or 36 months), can be protected from exposure to water, water vapor, and/or oxygen originating from outside of the package/container. Such storage prevents a product from going stale and/or rancid, or any other form of spoilage or loss of freshness or function.

A coating composition as applied and dried (i.e., a layer of a coating composition) on a cellulose substrate herein (or any other substrate) can comprise about, at least about, or less than about, 0.01, 0.05, 0.1, 0.2, 0.25, 0.3, 0.4, 0.5, 0.6, 0.7, 0.75, 0.8, 0.9, 1.0, 1.2, 1.25, 1.4, 1.5, 1.6, 1.75, 1.8, 2.0, 2.25, 2.5, 3.0, 3.5, 4.0, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 55, 56, 57, 58, 59, 60, 5-20, 5-15, 5-12.5, 7.5-20, 7.5-15, 7.5-12.5, 7-11, 8-10, 5-60, 5-55, 5-50, 5-5, 5-40, 5-35, 5-30, 7.5-60, 7.5-55, 7.5-50, 7.5-45, 7.5-40, 7.5-35, 7.5-30, 10-60, 10-55, 10-50, 10-45, 10-40, 10-35, 10-30, 20-60, 20-55, 20-50, 20-45, 20-40, 20-35, 20-30, 30-60, 30-55, 30-50, 30-45, 30-40, 35-60, 35-55, 35-50, 35-45, 35-40, 40-60, 40-55, 40-50, 40-45, 45-60, 45-55, or 45-50 wt % of an insoluble alpha-glucan as presently disclosed, for example. Such a layer/coating in any of the foregoing aspects can comprise an amount of rubber that brings the total wt % to about 100 wt % (if the coating comprises only insoluble alpha-glucan and rubber), for example, or to a wt % of about 99.9, 99.5, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 50, 59, 58, 57, 56, 55, 54, 53, 52, 51, or 50 wt % (where this foregoing wt % is that of the contribution of insoluble alpha-glucan and rubber to the coating) if there are optionally any other components/additives (the wt % of such one or more other components/additives can bring the total wt % to 100 wt %; the wt % of a component/additive in a coating is effectively disclosed herein based on the foregoing wt % amounts of insoluble alpha-glucan and rubber). Optionally, any of the foregoing wt % values/ranges can be on a dry weight basis.

One or more other components/additives can be in a coating composition herein, if desired. An additive herein can be any compound of the present disclosure. The disclosure of an additive herein typically is with regard to its state of existence before being used to prepare a composition herein (i.e., the state in which an additive would be provided before mixing with other components herein). In some aspects, an additive comprises or consists of a non-aqueous liquid and/or a hydrophobic or non-polar liquid or composition. A non-aqueous liquid can be polar or non-polar (apolar), for example. An additive in some aspects can comprise or consist of a solid material. An additive can have neutral, negative (anionic), or positive (cationic) charge, for example; i.e., an additive can be charged. Examples of charged additives include charged polysaccharides and charged polysaccharide derivatives (e.g., polysaccharide ethers) (e.g., soluble or insoluble forms of these), such as any as disclosed herein (e.g., regarding an alpha-glucan, wherein at least about 50% of the glycosidic linkages of the alpha-glucan are alpha-1,3 glycosidic linkages, and the weight-average degree of polymerization of the alpha-glucan is at least 15). An additive can be any ingredient/component typically used in a personal care product, pharmaceutical product, household care product, industrial product, ingestible product, film/coating, composite, latex/dispersion/emulsion, encapsulant, detergent composition (e.g., fabric care, dish care), oral care, or builder composition, for example. As examples, an additive herein can be an oil such as mineral oil, silicone oil (e.g., dimethicone/polydimethylsiloxane, hexamethyldisiloxane), paraffin oil, or plant/vegetable oil (e.g., linseed oil, soybean oil, palm oil, coconut oil, canola oil, corn oil, sunflower oil, grape seed oil, cocoa butter, olive oil, rice bran oil, rapeseed oil, peanut oil, sesame oil, cottonseed oil, palm kernel oil); shortening (e.g., vegetable shortening); lipid; fat (e.g., lard, tallow, animal fat); glyceride (e.g., tri-, di- and/or mono-glyceride; e.g., caprylic/capric triglyceride); glycerol (or other polyol such as low molecular weight polyol); fatty acid; fatty aldehyde, fatty alcohol, fatty acid ester (e.g., sorbitan oleate); fatty acid amide; wax (e.g., paraffin wax, carnauba wax); phospholipid; sterol; alkane; alkene/olefin; petrolatum (i.e., petroleum jelly); anionic detergent (e.g., lauryl sulfate, alkylbenzene sulfonate); cationic detergent; non-ionic or zwitterionic detergent (e.g., polyoxyethylene-based detergent such as Tween or Triton [ethoxylates], glycoside-based detergents such as octyl thioglucoside maltoside, CHAPS); or any epoxidized versions of these; or any similar compound such as disclosed in U.S. Patent Appl. Publ. Nos. 2009/0093543 (e.g., Table 2 therein) or 2019/0144897, which are incorporated herein by reference. As examples, an additive herein can be a sugar alcohol (e.g., mannitol, sorbitol, xylitol, lactitol, isomalt, maltitol, hydrogenated starch hydrolysate), polymeric polyol (e.g., polyether polyol, polyester polyol, polyethylene glycol, polyvinyl alcohol), aprotic solvent (e.g., a polar aprotic solvent such as acetone or propylene carbonate), protic solvent (e.g., isopropanol, ethanol, methanol), hardener (e.g., active halogen compound, vinylsulfone, epoxy), resin (typically uncured) (e.g., synthetic resin such as epoxy or acetal resin; natural resin such as plant resin [e.g., pine resin], insect resin [e.g., shellac], or bitumin), or propanediol. Merely as examples, an additive herein can be a fragrance/scent (e.g., hydrophobic aroma compound, or any as disclosed in U.S. Pat. No. 7,196,049, which is incorporated herein by reference), ingestible product, food, beverage, flavor (e.g., any as disclosed in U.S. Pat. No. 7,022,352, which is incorporated herein by reference), hydrophobic flavorant or nutrient, or dye (e.g., oil-soluble dye such as Sudan red). As examples, an additive herein can be polyurethane, polyvinyl acetate, poly acrylate, poly lactic acid, polyvinylamine, polycarboxylate, a polysaccharide herein other than a water-insoluble alpha-glucan having at least 50% alpha-1,3 glycosidic linkages, a polysaccharide derivative herein (water-soluble or water-insoluble) such as a derivative of a water-insoluble alpha-glucan having at least 50% alpha-1,3 glycosidic linkages as presently disclosed or any other polysaccharide derivative herein, gelatin, melamine, inorganic filler material (e.g., carbon black, a silicate such as sodium silicate, talk, chalk, a clay such as bentonite clay, or a carbonate such as calcium carbonate, calcium-magnesium carbonate, sodium percarbonate, sodium carbonate, sodium bicarbonate, ammonium bicarbonate, barium carbonate, magnesium carbonate, potassium carbonate, or iron[II] carbonate), penetrant (e.g., 1,2-propanediol, triethyleneglycol butyl ether, 2-pyrrolidone), biocide (e.g., metaborate, thiocyanate, sodium benzoate, benzisothiaolin-3-one), yellowing inhibitor (e.g., sodium hydroxymethyl sulfonate, sodium p-toluenesulfonate), ultraviolet absorbers (e.g., benzotriazole compound), antioxidant (e.g., sterically hindered phenol compound), water-resistance agent (e.g., ketone resin, anionic latex, glyoxal), or binder (e.g., polyvinyl alcohol, polyvinyl acetate, partially saponified polyvinyl acetate, silanol-modified polyvinyl alcohol, polyurethane, starch, corn dextrin, carboxymethyl cellulose, cellulose ether, hydroxyethyl cellulose, hydroxypropyl cellulose, ethylhydroxyethyl cellulose, methyl cellulose, alginate, sodium alginate, xanthan, carrageenan, casein, soy protein, guar gum, styrene butadiene latex, styrene acrylate latex. In some aspects, an additive can be a bleaching agent (e.g., chlorine-based bleach such as sodium hypochlorite or chlorinated lime; peroxide-based bleach such as hydrogen peroxide, sodium percarbonate, peracetic acid, benzoyl peroxide, or potassium permanganate). In some aspects, an additive can be characterized/categorized as follows: amphiphilic material (e.g., surfactants such as lauryl sulfate; polymeric surfactants such as polyethylene glycol or polyvinyl alcohol; particles such as silica), aqueous-insoluble small molecules (e.g., mineral oil; silicone oil; natural oil such as linseed, soybean, palm, or coconut oil), aqueous-insoluble polymeric molecules (e.g., polyacrylate, polyvinylacetate, poly lactic acid), aqueous-miscible small molecules (e.g., protic solvents such as isopropanol, ethanol, or methanol; polar aprotic solvents such as acetone or propylene carbonate; low molecular weight polyols such as glycerol; sugar alcohols), or water-miscible polymeric molecules (e.g., a polyol). In some aspects, an additive can be an alkyl ketene dimer (AKD), alkenyl succinic anhydride (e.g., octenyl succinic anhydride), epoxy compound (e.g., epoxidized linseed oil or a di-epoxy), phenethyl alcohol, undecyl alcohol, or tocopherol. In some aspects, an additive comprises an oil or any other hydrophobic solvent herein in which a hydrophobic substance (e.g., any as disclosed herein such as a hydrophobic fragrance, flavor, nutrient, or dye) has been dissolved. An additive herein typically is not only a salt (salt ion) or buffer such as $Na^+$, $Cl^-$, NaCl, phosphate, tris, or any other salt/buffer such as disclosed in U.S. Patent Appl. Publ. Nos. 2014/179913, 2016/0304629, 2016/0311935, 2015/0239995, 2018/0230241, or 2018/0237816, which are incorporated herein by reference. An additive can be any as disclosed in U.S. Patent Appl. Publ. No. 2019/0153674 (incorporated herein by reference), for example.

A layer of a coating composition on a cellulose substrate herein (or any other substrate) can have a thickness of about, at least about, or less than about 1, 2.5, 5, 10, 15, 20, 25, 30, 35, 40, 45, 50, 55, 60, 65, 70, 85, 90, 95, 100, 105, 110, 120, 130, 140, 150, 160, 170, 180, 190, 200, 10-30, 10-25, 10-20, 15-30, 15-25, 15-20, 70-130, 70-120, 70-110, 70-100, 80-130, 80-120, 80-110, 80-100, 90-130, 90-120, 90-110, or 90-100 microns (micrometers, μm), for instance. In some aspects, such thickness is uniform, which can be characterized by having a contiguous area that (i) is at least 20%, 30%, 40%, or 50% of the total coating area, and (ii) has a standard deviation of thickness of less than about 0.5, 1, 1.5, or 2 microns.

A cellulose substrate (or any other substrate) typically is coated with one layer (a single layer) of a coating composition herein. However, in some aspects, there can be multiple (e.g., two, three, or more) coats of a coating composition, and such additional coat(s) can be the same as, or different from, the first coat. In some aspects, a coating can have been applied to a rubber coating (e.g. comprising about, or at least about, 85, 90, 95, 98, 99, 99.5, or 100 wt % rubber herein) (such rubber coating can be as applied to a substrate herein). In some aspects, a coating as applied onto a rubber coating can comprise about, or at least about, 80, 85, 90, 95, 98, 99, 99.5, or 100 wt % insoluble alpha-glucan herein. In some aspects, a coating comprising about, or at least about, 80, 85, 90, 95, 98, 99, 99.5, or 100 wt % insoluble alpha-glucan herein can be deposited onto a coating of the present disclosure (i.e., be an overcoat); however, in some alternative aspects, a different insoluble glucan (instead of the foregoing alpha-glucan) is in an overcoat. Such a different insoluble glucan can be beta-1,4-glucan or beta-1,3-glucan, for example. There can be a single overcoat, or multiple (e.g., two, three, or more) overcoats, for example.

A layer of a coating composition on a cellulose substrate herein (or any other substrate) can exhibit various degrees of transparency as desired. For example, a coating can be highly transparent (e.g., high light transmission, and/or low haze). Optical transparency as used herein can, for example, refer to a coating allowing at least about 10-99% light transmission, or at least about 50%, 60%, 70%, 80%, 90%, 95%, 96%, 97%, 98%, or 99% light transmission, and/or less than 30%, 25%, 20%, 15%, 10%, 5%, 2.5%, 2%, or 1% haze. High optical transparency can optionally refer to a coating having at least about 90% light transmittance and/or a haziness of less than 10%. Light transmittance of a coating herein can be measured following test ASTM D1746 (2009, *Standard Test Method for Transparency of Plastic Sheeting*, ASTM International, West Conshohocken, PA), for example, which is incorporated herein by reference. Haze of a coating herein can be measured following test ASTM D1003-13 (2013, *Standard Test Method for Haze and Luminous Transmittance of Transparent Plastics*, ASTM International, West Conshohocken, PA), for example, which is incorporated herein by reference.

A layer of a coating composition on a cellulose substrate herein (or any other substrate) can optionally further comprise a plasticizer such as glycerol, propylene glycol, ethylene glycol, and/or polyethylene glycol. In some aspects, other coating components (in addition to at least insoluble alpha-glucan and rubber) can be as disclosed in U.S. Patent. Appl. Publ. No. 2011/0151224 or 2015/0191550, or U.S. Pat. No. 9,688,035 or 3,345,200, all of which are incorporated herein by reference.

In some aspects, a portion of insoluble alpha-glucan particles in a layer of a coating composition on a cellulose substrate are immediately adjacent to cellulose fibers of the cellulose substrate and interact with the cellulose fibers (e.g., via hydrogen bonding). The portion of the insoluble alpha-glucan particles located in this manner in a coating can be about, or at least about, or less than about, 0.01%, 0.05%, 0.1%, 0.5%, or 1% by weight of all the insoluble alpha-glucan particles in the coating.

In some aspects, water or an aqueous solution is in contact with the layer of the coating composition, and the water or aqueous solution is in the form of one or more droplets having a contact angle of at least about 60°. The contact angle of the droplets can be about, or at least about, 60°, 65°, 70°, 75°, 80°, 85°, 90°, 95°, 60°-95°, 60°-90°, 60°-85°, 60°-80°, 65°-95°, 65°-90°, 65°-85°, 65°-80°, 70°-95°, 70°-90°, 70°-85°, 70°-80°, 75°-95°, 75°-90°, 75°-85°, 75°-80°, 80°-95°, 80°-90°, 80°-85°, 85°-95°, or 85°-90°, for example. In some aspects, the one or more droplets can maintain a foregoing contact angle for a time of about, or at least about, 1, 2, 3, 4, 5, 10, 15, 20, 25, 30, 60, 90, 120, 150, or 180 minutes. Typically, the layer that is in contact with the droplets is on the outer/exterior surface of the packaging or coating.

In some aspects, a cellulose substrate as coated with at least one layer of a coating composition herein can have a wet tensile strength of about, or at least about, 8, 9, 10, 11, 12, 13, 14, 15, 16, 17, 18, 8-18, 8-16, 8-14, 8-12, 8-11, 8-10, 9-18, 9-16, 9-14, 9-12, 9-11, 9-10, 10-18, 10-16, 10-14, 10-12, or 10-11 MPa (megapascals). Wet tensile strength can be as measured following the exposure (e.g., immersion) of the cellulose substrate to water or aqueous solution for a time of about, or at least about, 1, 2, 3, 4, 5, 10, 15, 20, 25, 30, 60, 90, 120, 150, or 180 minutes, for example. Wet tensile strength can be as measured according to the below Examples (e.g., where each condition/parameter is conducted within 5%, 10%, or 15% of the relevant condition/parameter disclosed in the Examples) or as disclosed in ISO 1924-2/3 (ISO, International Organization for Standardization), for instance, which is incorporated herein by reference.

In some aspects, a cellulose substrate as coated with at least one layer of a coating composition herein can have a wet elastic modulus of about, or at least about, 300, 400, 500, 600, 700, 800, 900, 1000, 300-1000, 300-900, 300-800, 300-700, 300-600, 300-500, 400-1000, 400-900, 400-800, 400-700, 400-600, or 400-500 MPa. Wet elastic modulus can be as measured following the exposure (e.g., immersion) of the cellulose substrate to water or aqueous solution for a time of about, or at least about, 1, 2, 3, 4, 5, 10, 15, 20, 25, 30, 60, 90, 120, 150, or 180 minutes, for example. Wet elastic modulus can be as measured according to the below Examples (e.g., where each condition/parameter is conducted within 5%, 10%, or 15% of the relevant condition/parameter disclosed in the Examples), for instance.

In some aspects, a cellulose substrate (or any other substrate) as coated with at least one layer of a coating composition herein, or the layer of the coating composition itself, can have an oil Cobb value of about, or less than about, 60, 50, 40, 30, 20, 15, 10, 5, 4, 3, 2, 1, 0.5-2, 0.5-1.5, 0.5-1.25, 0.5-1, 0.75-2, 0.75-1.5, 0.75-1.25, 0.75-1, 15-60, 15-50, 15-40, 15-30, 20-60, 20-50, 20-40, 20-30, 30-60, 30-50, or 30-40 $g/m^2$. Oil Cobb values can be as measured according to the below Examples (e.g., where each condition/parameter is conducted within 5%, 10%, or 15% of the relevant condition/parameter disclosed in the Examples) or as disclosed in ISO 535 or TAPPI T441 (TAPPI, Technical Association of the Pulp and Paper Industry) (but each ISO or TAPPI test using a vegetable oil instead of water), for instance, which are incorporated herein by reference.

In some aspects, a cellulose substrate (or any other substrate) as coated with at least one layer of a coating composition herein, or the layer of the coating composition itself, can have a water vapor permeability of about, or less than about $1.2\times10^{-2}$, $1.15\times10^{-2}$, $1.10\times10^{-2}$, $1.05\times10^{-2}$, $1.05\times10^{-2}$-$1.2\times10^{-2}$, $1.1\times10^{-2}$-$1.2\times10^{-2}$, $1.05\times10^{-2}$-$1.15\times10^{-2}$, or $1.1\times10^{-2}$-$1.15\times10^{-2}$ $(g\cdot m)/(h\cdot m^2\cdot Pa)$. Water vapor permeability can be as measured according to the below Examples (e.g., where each condition/parameter is conducted within 5%, 10%, or 15% of the relevant condition/parameter disclosed in the Examples) or as disclosed in ASTM E96 (American Society for Testing and Materials), for instance, which is incorporated herein by reference.

In some aspects, a cellulose substrate (or any other substrate) as coated with at least one layer of a coating composition herein, or the layer of the coating composition itself, can have an oxygen (oxygen gas) permeability of about, or less than about, $2.25\times10^{-4}$, $2\times10^{-4}$, $1.75\times10^{-4}$, $1.5\times10^{-4}$, $1.25\times10^{-4}$, $1\times10^{-4}$, $0.75\times10^{-4}$, $0.5\times10^{-4}$, $0.25\times10^{-4}$, $0.1\times10^{-4}$, $0.1\times10^{-4}$-$2.25\times10^{-4}$, $0.1\times10^{-4}$-$2\times10^{-4}$, $0.1\times10^{-4}$-$1.75\times10^{-4}$, $0.1\times10^{-4}$-$1.5\times10^{-4}$, $0.1\times10^{-4}$-$1.25\times10^{-4}$, $0.1\times10^{-4}$-$1\times10^{-4}$, $0.1\times10^{-4}$-$0.75\times10^{-4}$, $0.1\times10^{-4}$-$0.5\times10^{-4}$, $0.1\times10^{-4}$-$0.25\times10^{-4}$, $0.25\times10^{-4}$-$2.25\times10^{-4}$, $0.25\times10^{-4}$-$2\times$ $10^{-4}$, $0.25\times10^{-4}$-$1.75\times10^{-4}$, $0.25\times10^{-4}$-$1.5\times10^{-4}$, $0.25\times10^{-4}$-$1.25\times10^{-4}$, $0.25\times10^{-4}$-$1\times10^{-4}$, $0.25\times10^{-4}$-$0.75\times10^{-4}$, $0.25\times10^{-4}$-$0.5\times10^{-4}$, $0.5\times10^{-4}$-$2.25\times10^{-4}$, $0.5\times10^{-4}$-$2\times10^{-4}$, $0.5\times10^{-4}$-$1.75\times10^{-4}$, $0.5\times10^{-4}$-$1.5\times10^{-4}$, $0.5\times10^{-4}$-$1.25\times10^{-4}$, $0.5\times10^{-4}$-$1\times10^{-4}$, $0.5\times10^{-4}$-$0.75\times10^{-4}$, $1\times10^{-4}$-$2.25\times10^{-4}$, $1\times10^{-4}$-$2\times10^{-4}$, $1\times10^{-4}$-$1.75\times10^{-4}$, $1\times10^{-4}$-$1.5\times10^{-4}$, or $1\times10^{-4}$-$1.25\times10^{-4}$ $(cm^3\cdot m)/m^2\cdot Pa\cdot s)$. Oxygen permeability can be as measured according to the below Examples (e.g., where each condition/parameter is conducted within 5%, 10%, or 15% of the relevant condition/parameter disclosed in the Examples) or as disclosed in Johansson et al. (2019, *Journal of Applied Packaging Research* 11:49-63), for instance, which is incorporated herein by reference. In some aspects, the oxygen permeability is as measured in an environment with a relative humidity level of about, or at least about, 10%, 20%, 30%, 40%, 50%, 60%, 70%, 80%, 90%, 100%, 20%-100%, 30%-100%, 40%-100%, 50%-100%, 60%-100%, 70%-100%, 80%-100%, 20%-90%, 30%-90%, 40%-90%, 50%-90%, 60%-90%, 70%-90%, or 80%-90%.

In some aspects, a cellulose substrate (or any other substrate) as coated with at least one layer of a coating composition herein, or the layer of the coating composition itself, can have a Kit value of, or at least, 5, 6, 7, 8, 9, 10, 11, 12, 5-12, 6-12, 7-12, 8-12, 9-12, 10-12, 5-11, 6-11, 7-11, 8-11, 9-11, 10-11, 5-10, 6-10, 7-10, 8-10, or 9-10. Kit values can be as measured according to the below Examples (e.g., where each condition/parameter is conducted within 5%, 10%, or 15% of the relevant condition/parameter disclosed in the Examples) or as disclosed in TAPPI T559, for instance, which is incorporated herein by reference.

A layer of a coating composition in some aspects has less tackiness as compared to a coating comprising at least 85 wt % rubber. The "tackiness" of a coating herein refers to its degree of stickiness, particularly as exhibited from the side of the coating opposite the side in contact with the surface of a substrate or previously applied coating. A coating of the present disclosure can have a tackiness that is about, or less than about, 10%, 20%, 30%, 40%, or 50% of the tackiness of a coating that has about, or at least about, 85, 90, 95, 98, 99, 99.5, or 100 wt % rubber herein, for example. Tackiness herein is typically that of a dry coating, and/or can be measured according to the disclosure of Roberts (Review of Methods for the Measurement of Tack, PAJ1 Report No. 5, September 1997), Malvern Instruments Limited (Assessing tackiness and adhesion using a pull away test on a rotational rheometer, 2015, AN150527), or U.S. Pat. No. 6,958,154, for example, which are incorporated herein by reference.

In some aspects, a cellulose substrate as coated with one or more layers of a coating composition has at least one fold crease, and the layer of the coating composition has resistance to oil or grease penetration at the fold crease. Such oil/grease resistance can be in terms of an oil Cobb value or Kit value herein, for example. Resistance to oil/grease can be as compared to the same coated substrate, but which does not have a fold crease; resistance to oil/grease penetration at a fold crease can be about, or at least about, 40%, 50%, 60%, 70%, 80%, 90%, 95%, or 100% of the resistance to oil/grease penetration exhibited by the coated substrate without the fold crease (i.e., otherwise flat coated substrate exposed to oil/grease). A fold crease herein typically refers to the deformation/crease that occurs where a coated substrate has been folded. Some aspects herein regard a coated substrate that has a fold crease on which oil/grease has been applied, and the coated substrate at the crease resists oil/grease penetration through the coating layer at/along the crease. Oil penetration resistance is, for instance, with respect to when oil is applied to the outer portion of a crease (i.e., the coating layer will have been subject to stretch when folded) or the inner portion of a crease (i.e., the coating layer will have been subject to compression when folded). A fold crease herein can have been made on purpose (purposeful crease) (e.g., for a folded container) or not on purpose.

A layer of a coating composition herein can be produced in some aspects by a coating process comprising at least (a) providing a dispersion of at least insoluble alpha-glucan and rubber in an aqueous liquid such as water, (b) applying the dispersion to at least a portion of the surface of a cellulose substrate (or optionally any other substrate disclosed herein) (and/or optionally to a pre-existing/pre-applied coating such as a rubber-only coating or any coating disclosed herein), and (c) removing all of, or most of (e.g., at least about 95%, 96%, 97%, 98%, 99%, 99.5%, 99.9%) the water (and other solvent, if present) from the applied dispersion (e.g., drying such as air drying or oven drying).

A layer of a coating composition herein can be produced in some aspects by a coating process comprising at least (a) providing a caustic solution (e.g., aqueous) comprising at least insoluble alpha-glucan (dissolved in the caustic solution) and rubber, (b) applying the caustic solution to at least a portion of the surface of a cellulose substrate (or optionally any other substrate disclosed herein) (and/or optionally to a pre-existing/pre-applied coating such as a rubber-only coating or any coating disclosed herein), (c) neutralizing (or coagulating) the caustic solution to provide a solid layer (on the substate) comprising at least the insoluble alpha-glucan and the rubber, and (d) optionally washing and/or drying (e.g., as above) the neutralized solid layer. An aqueous caustic solvent of a caustic solution can comprise an alkali hydroxide, for example, typically dissolved in water. An alkali hydroxide can comprise at least one metal hydroxide (e.g., NaOH, KOH, LiOH) or organic hydroxide (e.g., tetraethyl ammonium hydroxide). The concentration of an alkali hydroxide(s) in an aqueous caustic solvent can be about, or at least about, 3, 4, 5, 6, 7, 8, 9, 10, 11, 12, 13, 14, 15, 3-15, 3-12, 3-10, 3-8, 3-7, 3-6, 3-5, 3-4.5, 4-15, 4-12, 4-10, 4-8, 4-7, 4-6, 4-5, or 4-4.5 wt %, for example. An aqueous caustic solvent can be as disclosed, for example, in Int. Pat. Appl. Publ. Nos. WO2015/200612 or WO2015/200590, or U.S. Pat. Appl. Publ. Nos. 2017/0208823 or 2017/0204203, which are each incorporated herein by reference. The pH of an aqueous caustic solution herein and/or its caustic solvent can be about, or at least about, 10.5, 10.75, 11.0, 11.5, 12.0, 12.5, 13.0, 10.5-13.0, 10.5-12.5, 10.75-13.0, 10.75-12.5, 11.0-13.0, 11.0-12.5, 11.5-13.0, 11.5-12.5, 12.0-13.0, 12.0-12.5, or 12.5-13.0, for example. The temperature of a caustic solution herein can be about, or at least about, 1, 5, 10, 15, 20, 25, 30, 35, 40, 45, 50, 60, 70, 80, 90, 100, 110, 1-70, 1-60, 1-50, 1-45, 1-40, 1-35, 1-30, 1-25, 1-20, 15-70, 15-60, 15-50, 15-45, 15-40, 15-35, 15-30, 15-25, 15-20, 20-70, 20-60, 20-50, 20-45, 20-40, 20-35, 20-30, 20-25, 5-30, 10-30, 5-25, or 10-25 °C, for example. A coagulation/neutralization medium for performing neutralization step (c) can comprise at least one non-solvent for the alpha-glucan, such as alcohol (e.g., methanol, ethanol, propanol), water, acid, or a mixture thereof. An acid for a coagulation/neutralization medium can be sulfuric acid, acetic acid, or citric acid, for example. The amount of caustic solvent that is removed in neutralization step (c) can be about, or at least about, 80%, 85%, 90%, 95%, 96%, 97%, 98%, 99%, 99.5%, 99.9%, 100%, 80-100%, 90-100%, 95-100%, or 98-100% by weight of the caustic solvent that was present before performing step (c), for example.

In some aspects, one or more additional coatings/layers can be placed or deposited onto a coating(s) of the present disclosure. Such one or more additional coatings typically contain material(s) different from the material (e.g., rubber and/or insoluble alpha-glucan) present in the first coating(s). An additional coating(s) can optionally act to seal the first coating(s); for example, material can be applied that is amenable to being heat-sealed over the first coating(s). A material that can be used for sealing herein (e.g., heat-sealing), or otherwise used in an additional coating, can comprise one or more of a suitable polyolefin (e.g., polyethylene, polypropylene), polyester (e.g., polyethylene terephthalate), biopolymer (e.g., poly lactic acid, poly butylene succinate, poly butylene succinate-co-adipate, poly butylene adipate terephthalate, poly hydroxyalkanoate, poly 3-hydroxybutyrate-co-3-hydroxyvalerate, poly 3-hydroxybutyrate-co-3-hydroxyhexanoate), thermoplastic polyurethane, glucan ester (e.g., glucan acetate, glucan palmitate, alpha-1,3-glucan ester), or cellulose derivative (e.g., cellulose ester), for example. Application of an additional coating(s) herein can be performed using any suitable process, for example, such as by extrusion lamination, transfer lamination (wet or dry), or coating from a dispersion.

Non-limiting examples of compositions and methods disclosed herein include:

1. A composition comprising a cellulose substrate (or optionally any other substrate disclosed herein such as leather, metal, non-cellulose-based polymer or fibrous material [e.g., polymer or fibrous material comprising polyamide, polyolefin, polylactic acid, polyethylene terephthalate, poly trimethylene terephthalate, aramid, polyethylene sulfide, polyphenylene sulfide, polyimide, polyethylene imine, polyethylene naphthalate, polysulfone, polyether ether ketone, polyethylene, polypropylene, poly cyclic olefins, poly cyclohexylene dimethylene terephthalate, and poly trimethylene furandicarboxylate], masonry, drywall, plaster, glass, architectural, or wood surface), wherein at least a portion of the cellulose substrate is coated with at least one layer (a continuous layer) of a coating composition that comprises at least (i) rubber or other diene-based elastomer, and (ii) an insoluble alpha-glucan, wherein at least about 50% of the glycosidic linkages of the alpha-glucan are alpha-1,3 linkages.
2. The composition of embodiment 1, wherein at least about 90% of the glycosidic linkages of the insoluble alpha-glucan are alpha-1,3 glycosidic linkages.
3. The composition embodiment 1 or 2, wherein the insoluble alpha-glucan has a weight-average degree of polymerization (DPw) of at least about 10.
4. The composition of embodiment 3, wherein the DPw of at least about 400.
5. The composition of embodiment 1, 2, 3, or 4, wherein the cellulose substrate is paper, cardboard, paperboard, corrugated board, or boxboard.
6. The composition of embodiment 1, 2, 3, 4, or 5, wherein the rubber comprises natural rubber.
7. The composition of embodiment 1, 2, 3, 4, 5, or 6, wherein the coating composition comprises about 5 wt % to about 60 wt % of the insoluble alpha-glucan, and about 40 wt % to about 95 wt % of the rubber, optionally on a dry weight basis (dwb).
8. The composition of embodiment 1, 2, 3, 4, 5, 6, or 7, wherein the layer of the coating composition is at least about 10 microns.
9. The composition of embodiment 1, 2, 3, 4, 5, 6, 7, or 8, wherein particles of the insoluble alpha-glucan in the layer of the coating composition that are immediately adjacent to cellulose fibers of the cellulose substrate interact (optionally via hydrogen bonding) with the cellulose fibers.
10. The composition of embodiment 1, 2, 3, 4, 5, 6, 7, 8, or 9, wherein the composition is a packaging or container.
11. The composition of embodiment 10, wherein the packaging or the container holds a product, optionally wherein the layer of the coating composition is in contact with the product.
12. The composition of embodiment 11, wherein the product comprises oil, grease, and/or water on its surface and the product is in contact with the layer of the coating composition, wherein at least a portion of the oil, grease, and/or water is contained inside the packaging or container (i.e., the oil, grease, or water is not able to transit through the packaging or container to be on the outer/exterior surface of the packaging or container).
13. The composition of embodiment 11 or 12, wherein the product is an ingestible product (e.g., food product), pharmaceutical product, personal care product, home care product, or industrial product.
14. The composition of embodiment 1, 2, 3, 4, 5, 6, 7, 8, 9, 10, 11, 12, or 13, wherein water is in contact with the layer of the coating composition, and the water is in the form of one or more water droplets having a contact angle of at least about 60° (typically wherein the layer which is in contact with the water is on the outer/exterior surface of the packaging or coating).
15. The composition of embodiment 1, 2, 3, 4, 5, 6, 7, 8, 9, 10, 11, 12, 13, or 14, wherein the cellulose substrate has (by virtue of it having a layer of the coating composition): (i) a wet tensile strength of at least about 8 MPa, (ii) a wet elastic modulus of at least about 300, (iii) an oil Cobb value of less than about 60 $g/m^2$, (iv) a water vapor permeability of less than about $1.2\times10^{-2}$ $(g\cdot m)/(h\cdot m^2\cdot Pa)$, (v) an oxygen permeability of less than $2.25\times10^{-4}$ $(cm^3\cdot m)/m^2\cdot Pa\cdot s)$, (vi) an oxygen permeability of less than $1.6\times10^{-4}$ $(cm^3\cdot m)/m^2\cdot Pa\cdot s)$ at a relative humidity of at least about 40%, and/or (vii) a Kit value of at least 5.
16. The composition of embodiment 1, 2, 3, 4, 5, 6, 7, 8, 9, 10, 11, 12, 13, 14, or 15, wherein the layer of the coating composition has a tackiness that is less than 50% of the tackiness of a layer of a coating composition that comprises at least about 85 wt % rubber or other diene-based elastomer.
17. The composition of embodiment 1, 2, 3, 4, 5, 6, 7, 8, 9, 10, 11, 12, 13, 14, 15, or 16, wherein the cellulose substrate as coated with the layer of the coating composition has at least one fold crease, and wherein the layer of the coating composition has resistance to oil or grease penetration at the fold crease.
18. The composition of embodiment 1, 2, 3, 4, 5, 6, 7, 8, 9, 10, 11, 12, 13, 14, 15, 16, or 17, wherein at least one overcoat comprising at least about 80 wt % of an insoluble glucan is on said at least one layer of the coating composition, optionally wherein the insoluble glucan is alpha-glucan having at least about 50% alpha-1,3 glycosidic linkages.

EXAMPLES

The present disclosure is further exemplified in the following Examples. It should be understood that these Examples, while indicating certain aspects herein, are given by way of illustration only. From the above discussion and these Examples, one skilled in the art can ascertain the essential characteristics of the disclosed embodiments, and without departing from the spirit and scope thereof, can make various changes and modifications to adapt the disclosed embodiments to various uses and conditions.

Materials

Stabilized natural rubber (NR) latex (60 wt % solids, 40 wt % water) was purchased from Chemionics Corporation. Toluene, n-heptane and castor oil were purchased from Sigma Aldrich. Polyvinyl alcohol (PVOH) with a molecular weight of 72,000 g/mol was obtained from MP Biomedicals and heptane was supplied by OmniSolv.

Representative Preparation of Alpha-1,3-Glucan

Alpha-1,3-glucan with ~100% alpha-1,3 glycosidic linkages can be synthesized, for example, following the procedures disclosed in U.S. Appl. Publ. No. 2014/0179913 (see Example 12 therein, for example), which is incorporated herein by reference.

As another example, a slurry of alpha-1,3-glucan was prepared from an aqueous solution (0.5 L) containing *Streptococcus salivarius* gtfJ enzyme (100 unit/L) as described in U.S. Patent Appl. Publ. No. 2013/0244288 (incorporated herein by reference), sucrose (100 g/L) obtained from OmniPur Sucrose (EM8550), potassium phosphate buffer (10 mM) obtained from Sigma Aldrich, and FermaSure®, an antimicrobial agent (100 ppm), obtained from DuPont adjusted to pH 5.5. The resulting enzyme reaction was maintained at 20-25 °C for 24 hours. A slurry was formed since the alpha-1,3-glucan synthesized in the reaction was aqueous-insoluble. The alpha-1,3-glucan solids were then collected using a Buchner funnel fitted with a 325-mesh screen over 40-micrometer filter paper, forming a wet cake that contained about 60-80 wt % water. The wet cake used in Example 2 below contained about 40 wt % alpha-1,3-glucan and 60 wt % water.

Example 1

In this Example, various formulations having 10 wt % alpha-1,3-glucan (~100% alpha-1,3 glycosidic linkages, DPw~800, aqueous insoluble) and 4 wt % NaOH were prepared to include two additives: alkyl ketene dimer (AKD) (Kemira KD 574M) and natural rubber (NR) latex (Centex LATZ supplied by Momentum Technologies). Both AKD and NR latex were in the form of water dispersions with different solids contents. The formulations were prepared in a way that the concentration of each component of the final coating in the dried state was known, as indicated in Table 1. For Sample 1, the final coating composition had 67 wt % alpha-1,3-glucan and 33 wt % AKD. The final coating composition for Sample 2 had 50 wt % alpha-1,3-glucan and 50 wt % AKD. The final coating composition for Sample 3 had 25 wt % alpha-1,3-glucan and 75 wt % NR latex.

The coating preparations were individually applied to paper substrates (A4 sheets supplied by Pixelle Specialty Paper Solutions with a grammage of 83 g/m$^2$) using an automatic rod coater; however, other deposition methods could have been used, such as blade coating, spraying, or any other suitable means. Each coating preparation was applied as a water dispersion to the paper substrates and then allowed to air-dry.

The oil and water barrier properties of each coating were quantified using the Cobb test (ISO 535, TAPPI T441, SCAN P 12, EN 20535, DIN 53132, incorporated herein by reference) using castor oil or water. Each measurement lasted for 60 seconds for the Cobb oil tests (referred to as Cobb Oil 60) and 300 seconds for the Cobb water tests (referred to as Cobb $H_2O$ 300). These measurements are listed in Table 1. The grease barrier function of each coating was measured using the Kit test (TAPPI T559, incorporated herein by reference; Kit values range from 1 to 12 where 1 is for poorest performance and 12 is for best performance).

TABLE 1

Composition and Barrier Function of Coating Compositions, as Dried on Paper, Having Alpha-1,3-Glucan with AKD or NR

| | Control Uncoated | Sample 1 67 wt % Glucan 33 wt % AKD | Sample 2 50 wt % Glucan 50 wt % AKD | Sample 3 25 wt % Glucan 75 wt % NR |
|---|---|---|---|---|
| Coating grammage (gsm*) | 0 | 7.4 | 8.0 | 19.8 |
| Cobb Oil 60 (gsm) | 40.0 | 0.9 | 0.7 | 0.8 |
| Cobb $H_2O$ 300 (gsm) | 37.6 | 26.3 | 26.0 | 26.0 |
| Kit value | 0 | 3 | 3 | 12 |

*gsm, gram per square meter.

As shown in Table 1, each of Samples 1-3 exhibited excellent oil barrier properties and an improved water barrier, as compared to the uncoated control sample. Overall, compared to uncoated paper, the surfaces of each of paper Samples 1-3 are hydrophobic and very oleophobic, offering a good liquid barrier. Sample 3 also exhibited excellent grease barrier function (data not shown).

Example 2

This Example was conducted to investigate the barrier performance of the combination of alpha-1,3-glucan and NR latex in paper coating applications. It was hypothesized that the mutual aqueous colloidal dispersion of alpha-1,3-glucan and NR latex forms a stable latex system that can be applied to provide a consistent and functional barrier coating on cellulosic paper substrates. The effect of various composition ranges on the film-forming properties and barrier performance versus water vapor, oil, and oxygen were studied. Analytical techniques such as tensile strength testing, water vapor permeability testing, Cobb testing, and Kit testing were utilized to determine the properties of the prepared paper coatings.

Procedures

Coating Fabrication

Coating formulations were prepared with NR, alpha-1,3-glucan (~100% alpha-1,3 glycosidic linkages, DPw~800, aqueous insoluble) wet cake, and water while maintaining a constant total solids content of 10 wt % for all formulations. The fabrication procedure was initiated by pre-dispersing the alpha-1,3-glucan wet cake (wc) in water with a kitchen-type blender at high speed (10×) until achieving a viscous dispersion (~2600 cP). The alpha-1,3-glucan dispersion was then mixed with a calculated quantity of NR latex and distilled water to obtain the required formulations. The concentration of alpha-1,3-glucan in the coating film formulations was varied between 0 (control) and 100 parts per hundred (phr) alpha-1,3-glucan wet cake as shown in Table 2, while maintaining the total solids content at 10 wt % by adding water. The formulations were then mixed on a stir plate at 500 rpm for 10 min followed by homogenization (25,000 rpm×3 min) to obtain a uniform dispersion. Finally, the coatings were applied on a paper substrate utilizing a doctor blade to obtain 20 μm dry thickness. This coated paper was then allowed to dry at room temperature for 24 hours prior to testing.

TABLE 2

Composition of Paper Coating Formulations

| Sample label | NR, dry basis (phr) | Alpha-1,3-glucan, dry basis (phr) | Alpha-1,3-glucan (wt %) | Sample designation |
|---|---|---|---|---|
| NR | 100 | 0 | 0 | NR Control |
| NR-10wc | 100 | 10 | 9.09 | NR + 10 phr wc |
| NR-30wc | 100 | 30 | 23.08 | NR + 30 phr wc |
| NR-50wc | 100 | 50 | 33.33 | NR + 50 phr wc |
| NR-70wc | 100 | 70 | 41.18 | NR + 70 phr wc |
| NR-100wc | 100 | 100 | 50.00 | NR + 100 phr wc |

Morphology Analysis

Uniformity measurements of the coatings that were applied on paper, and the existing voids on the surface of the coatings, were obtained using a scanning electron microscope (FEI Quanta FEG 250 SEM). In this test, the coated papers were cryofractured and gold-coated to assess the surface and cross-sectional morphology of the specimens.

Contact Angle Measurement

Contact angle measurements of the control and coated paper surfaces were conducted using a custom-built system equipped with a programmable syringe pump (New Era Pump Systems Inc.) and a video camera to study the interaction of water with the coatings. About 3 μL of deionized water was dropped on the surface of the coated paper and images were captured at 0, 30 and 60 seconds. The contact angle was then calculated using ImageJ software.

Mechanical Properties

Dry tensile strength: Seven specimens (70 mm×20 mm strips) were cut from each coated paper sample. The tensile test was conducted according to ISO 1924-2/3 (incorporated herein by reference) with a 100 mm/min strain rate, using tensile testing equipment (AGS-X, Shimadzu, Japan).

Wet tensile strength: To determine wet strength, seven specimens were dipped in distilled water for 30 seconds or 1 minute in accordance with ASTM D829-97 (incorporated herein by reference). Excess water on the coated paper surface was blotted with a paper towel, and tensile strength testing was carried out immediately using the same tensile testing procedure as above.

Barrier Tests

Water Cobb test: The water Cobb test was run for 2 minutes as stated by TAPPI T441 (incorporated herein by reference) using five replicate specimens. About 10 $cm^2$ of circular samples were cut from coated paper, placed on the Cobb cylinder that contained a measured quantity of water, and tightly clamped by exposing the paper coating side towards the water. The Cobb cylinder was then reversed, and the paper coating was allowed to contact the water for 2 minutes. Subsequently, the coated paper was weighed after removing the excess water via gentle blotting. The weight difference before and after the test defines the Cobb value as described by equation (1):

$$Cobb's\ \text{value}(\text{g/m}^2) = (m_2 - m_1) \times 10000/\text{Area}(\text{cm}^2), \quad (1)$$

where $m_2$ and $m_1$ are the weight of the paper coating after and before the test, respectively.

Oil Cobb test: The oil Cobb oil test was employed in a manner similar to the water Cobb test to evaluate the amount of oil absorbed by the paper coating in 1 minute. In this test, canola oil was utilized, and five measurements were carried out for each coated paper in the oil Cobb test and the average was reported.

Water vapor barrier: The effect of the coating on the barrier performance of each coated paper sample against water vapor was evaluated according to ASTM E96 (incorporated herein by reference). For this method, cups with water were sealed tightly with coated paper so that the coating side faced the water. The change of weight of the cups was tracked for seven days. This test was carried out in triplicates for each coated paper sample. The water vapor permeability (WVP) was then calculated by obtaining the water vapor transmission rate (WVTR) and utilizing the equations (2) and (3):

$$WVTR = \frac{\Delta G}{t.A}, \quad (2)$$

and $$WVP = \frac{(WVTR) \times l}{\Delta p}, \quad (3)$$

where ΔG is the weight change (g), t is time (hr), A is the cross-sectional area of the cup mouth ($m^2$), I is the thickness of the samples, and Δp is the partial water vapor pressure difference between the two sides of the coated paper (1 Pa).

Oxygen barrier: Oxygen permeability (OP) was investigated using a custom-made bubble flowmeter. Coated paper specimens were cut in the shape of circles with a certain dimension (4.8 cm in diameter), placed in a chamber with the coating side exposed to pure oxygen and the other side of the paper coating was attached to the bubble flow meter system. By recording the required time for the bubble to travel 20 mL through a burette, the flow rate was calculated. This test was conducted at a fixed pressure of 2 psig and at different initial moisture contents of the coated paper, i.e., 30%, 60% and 99%. In order to adjust the moisture content of the coated papers, the specimens were kept in a desiccator where the relative humidity was tracked with a digital hygrometer immediately before the OP test. The OP was measured using equation (4):

$$OP = \left(\frac{V}{t.A}\right) \times \frac{l}{\Delta P}, \quad (4)$$

where VI(t·A) is the flux of the oxygen flow rate ($cm^3/m^2 \cdot s$), l is the thickness of the paper coatings (m), and ΔP is the pressure difference between the two sides of the paper coating.

Kit Test: The grease resistance of the paper coatings was analyzed using the Kit test in accordance with TAPPI T559 (incorporated herein by reference). In this test, twelve different grease solutions containing varying amounts of castor oil, n-heptane and toluene were prepared and applied on the coating surface. Each grease solution was then applied on at least five replicate paper coatings, and the surface of the coating was examined to observe any trace of staining. The highest number of grease solutions that did not leave any dark spots on the paper coatings was reported as the Kit number. A higher Kit number represents better grease resistance of the sample. A sample that attained a Kit number of at least 8 was reported as grease-resistant.

Effect of Paper Coating Thickness on Barrier Properties

Since paper is a porous substrate containing voids, the thickness of the coating plays an important role in blocking the voids and bringing about barrier properties. In this study, selected paper coating formulations with three different thicknesses (5, 20 and 100 μm) were fabricated in order to study the effect of the thickness on the barrier properties of the paper coatings, using WVP, OP, oil Cobb and Kit tests.

Comparison of Coating with Commercial Material

To obtain a better perspective of the effectiveness of the NR/alpha-1,3-glucan formulations as viable coatings, selected formulations were compared with commercial coatings that are widely utilized in the food-packaging industry. For this comparison, two different commercial polymer coatings, polyvinyl alcohol (PVOH) and polyethylene (PE) were selected due to the great moisture and oil barrier functions of PE, and the outstanding oxygen barrier performance of PVOH. To prepare the PVOH coating, PVOH was dissolved in distilled water (10 wt %) at 90 °C under stirring (600 rpm), cooled, and applied on a paper substrate using a doctor blade to obtain a 20 μm thickness. For a PE coating example, a commercial food container coated with PE (100 μm) was sourced from a restaurant chain and used for the study. The WVP, OP, oil Cobb and Kit tests were performed on these two paper coatings for comparison with the formulated coatings. The calculations were adjusted wherever required to account for the thickness variation of the PE coating with the other formulations.

Results and Discussion

Morphology of Coatings

Scanning electron microscope (SEM) images were collected to study the change in the morphology of paper as coated with NR alone or NR with alpha-1,3-glucan (SEM image data not shown). The surface of uncoated paper displayed voids and pores, and an uneven surface with recognizable individual fibers intertwined with each other. However, after applying any of the disclosed coatings, the cellulose fibers of the paper could hardly be distinguished and most of the voids were covered, leading to a relatively smooth surface.

Additionally, SEM images of a cross-section of uncoated paper exhibited the physical interlocking of the cellulose fibers, which results in the formation of pores throughout the paper. SEM images of a cross-section of paper coated with NR alone showed a distinguishable interface between the paper and NR. The substantial variation in the polarity of the cellulose in paper typically did not allow an intimate interaction with NR. On the other hand, with the addition of alpha-1,3-glucan to NR in the coating, hardly any interface could be detected due to the great compatibility between the alpha-1,3-glucan and the fibers of the paper.

The degree of dispersion of alpha-1,3-glucan in the NR coatings was also evaluated by SEM. It was found that, at a lower concentration of alpha-1,3-glucan (10 phr), a more uniform dispersion of the glucan filler particles was obtained.

Contact Angle Analysis

The wettability of the paper coating surfaces was assessed by measuring the contact angle with water. The variation of contact angle during a certain amount of time is shown in FIG. 1 with uncoated paper or paper coated with NR or NR/alpha-1,3-glucan. The small contact angle exhibited by the paper base (uncoated) is likely due to the hydrophilic nature of the paper and its porous structure. The NR coating exhibited a high contact angle over time. It was expected that, with the introduction of alpha-1,3-glucan with NR in the coatings, the degree of hydrophilicity of such coatings would increase, causing the contact angle to drop below 90°. However, after 1 minute of contact between the water droplet and the surface, the contact angle did not change significantly. This surprising result indicates the stability of the NR/alpha-1,3-glucan coatings. On the other hand, water droplets completely penetrated through the uncoated base paper after 30 seconds.

Dry and Wet Tensile Properties

Tensile strength is a parameter representing the resistance against failure of a material under tension. In general, the major determining factor of tensile strength of coated paper is the base paper substrate (Hong et al., 2005*, Packaging Technology and Science,* 18:1-9). While polymer coatings are typically less stiff than paper, they can act as adhesives of the paper fibers and enhance the strength. It is evident from FIG. 2 (panel [a]) that applying a coating to the base paper resulted in a trend to higher tensile strength than that of the uncoated paper. Also, it was apparent that incorporation of alpha-1,3-glucan in the coating had a positive influence at increasing the tensile strength of the coated paper in comparison to using a pure NR coating. As observed in this study, this was attributed to the alpha-1,3-glucan forming intimate physical interlocking and hydrogen bonding with the cellulose fibers constituting the paper substrate. Moreover, the alpha-1,3-glucan particles were small enough to travel through the pores and voids in the paper substrate and block pores while forming strong interactions. On the contrary, the elongation at break of paper remained almost unchanged (below 3%) from the baseline irrespective of the coating formulation variation indicating that the applied coatings (20 μm) did not noticeably affect the paper substrate's flexibility.

Enhancement in the elastic modulus was observed in the coated paper samples (FIG. 2, panel [b]) as compared to the elastic modulus of the uncoated paper. This outcome was ascribed to the adhesion and filling of pores by the NR latex in conjunction with the migration of the alpha-1,3-glucan particles between the pores of the cellulose fibers, thereby locking the movement of the fibers and presenting higher resistance against deformation under tension.

Tensile strength analysis was conducted to explore the strength of the coated paper when wet, as wet contact is relevant in food packaging. As expected, submersion of the coated paper specimens in water substantially reduced the tensile strength and modulus as compared to the corresponding dry specimens. However, while the mechanical strength deterioration was catastrophic for the uncoated paper, deterioration of the coated paper samples was visibly less. It is known that, when submersed in water, paper weakens and loses its integrity quickly as the water easily disrupts the non-bonded and hydrophilic cellulose fibers. Interestingly, for both the 30 second and 1 minute water submersions, a progressive improvement in the wet strength and wet elastic modulus of the coated specimens was noted with paper samples having coatings with increasing amounts of alpha-1,3-glucan (FIG. 2, panels [c] and [d]). This trend was likely caused by (i) the hydrophobic NR coating layer constituent that partially prevents water penetration, (ii) the blocking of the paper substrate cellulose fiber pores with the micron-sized alpha-1,3-glucan particles, and (iii) the strong interactions between the alpha-1,3-glucan particles and the cellulose fibers resulting in mechanical interlocking and hydrogen bonding during the coating process that effectively blocks moisture penetration. The trending improvement in the wet tensile strength properties of the coated specimens is in line with the corresponding dry tensile strength properties. Also, as noted from the SEM analysis of cross-sections of paper coatings having alpha-1,3-glucan, the interface of the coating and the paper substrate was indistinguishable, confirming that there is strong bonding between the alpha-1,3-glucan particles and cellulose fibers.

Barrier Properties

Water Cobb test results: The water Cobb test was employed to investigate the extent of water penetration prevention that the formulated coatings could provide to the paper substrate. In this method, the coatings were allowed to come in direct contact with water for 60 and 120 seconds, after which the Cobb value was calculated (equation 1). As illustrated in FIG. 3 (panel [a]), the lowest Cobb value belonged to the NR coating as a result of its hydrophobicity. By introducing alpha-1,3-glucan in the coating formulations, the Cobb values of the coated samples increased. However, the water absorption of the NR/alpha-1,3-glucan coated paper samples was significantly decreased, in the range of 6-18 times, as compared to the uncoated paper. This result has a positive bearing for using NR/alpha-1,3-glucan coated paper in food packaging applications.

Oil Cobb test results: The oil Cobb test was employed to investigate the extent of oil absorption prevention that the formulated coatings could provide to the paper substrate. The oil Cobb values have a reverse relation to the oil barrier performance of the coatings, as indicated in FIG. 3 (panel [b]). The results indicated that applying any of the coatings enhanced the oil barrier property of the paper substrate. Even though most of the coatings promoted oil barrier performance in general, this reduction was not remarkable as attributed to some voids remaining after the application of the thin layer coating (20 μm), which were observed on the SEM images. However, it is surprising and notable that a substantially low oil Cobb value was recorded with the paper coating having NR and 10 phr (9.09 wt %) alpha-1,3-glucan. This exceptional oil barrier behavior can be associated with good dispersion of the alpha-1,3-glucan in the NR as observed in by the SEM images as well as possible formation of a percolated network of alpha-1,3-glucan particles, which would effectively hinder the penetration of oil through the paper substrate.

Water vapor barrier results: The effect of the coatings on the water vapor permeability (WVP) of coated papers was studied and results are highlighted in FIG. 3 (panel [c]). This test was conducted at room temperature and constant relative humidity. As noted from WVP results, applying NR alone as a paper coating led to a drop in WVP values (i.e., increased barrier), which is attributed to the hydrophobicity of NR. Interestingly, a remarkable much lower reduction in WVP was recorded with paper coated with the NR-10wc (9.09 wt. % alpha-1,3 glucan) formulation. This value is attributable to the uniform dispersion of alpha-1,3-glucan through the coating, which led to the formation of a tortuous path for water molecules to penetrate the paper. This result strengthens the possibility of formation of a percolated network using a ~9.09 wt % (e.g., 5-15 wt %) loading of alpha-1,3-glucan in coatings. Increasing the alpha-1,3-glucan content in the paper coatings led to increased WVP (FIG. 3, panel [c]), which could be due to the formation of aggregates that leave a permeable route for moisture transport, and possibly further exacerbated by the hydrophilicity of alpha-1,3-glucan.

Oxygen permeability: The oxygen barrier of food packaging is of high importance in prolonging the shelf life of food (Zhu et al, 2018, *Carbohydrate Polymers* 200:100-105). Hence, the oxygen permeability (OP) of the prepared paper coatings was investigated to evaluate the ability of alpha-1,3-glucan and NR to act as oxygen barriers. As can be observed from (FIG. 3, panel [d]), the pure NR coating slightly improved the oxygen barrier of the paper. However, notably, introducing alpha-1,3-glucan to the coating led to a noticeable enhancement in the oxygen barrier by up to about 55%. It is contemplated that the high polarity of the alpha-1,3-glucan provided by its-OH functional groups does not allow easy diffusion and passage of oxygen through the coatings, as opposed to the coating with NR alone.

The effect of humidity on the OP of the coated paper samples was also investigated. Results shown in (FIG. 3, panel [e]) indicated that higher relative humidity of the surrounding environment reduced the OP of a paper with a coating having NR and about 33 wt % alpha-1,3-glucan (i.e., NR-50wc). This result was rather counterintuitive, and could be attributed to the hydrogen bond-mediated association and encapsulation of water vapor around the alpha-1,3-glucan particles and the paper substrate. Such bonded water could impede the passage of non-polar oxygen. Another possible reason for greater oxygen barrier by an NR/alpha-1,3-glucan coating at high relative humidly could be the reluctance of the coating to swell (there was no change in coating thickness when exposed to high humidity).

Grease barrier results: A Kit test was employed to examine the grease resistance of the coated paper samples. As can be observed from Table 3, the lowest Kit number was correlated with uncoated paper, which confirmed its high porosity. By employing a paper coating of NR alone or NR with alpha-1,3-glucan, the Kit number of the paper increased, since the coatings covered pores thereby creating a tortuous path for the grease oil molecules through the paper. It is noteworthy that the highest Kit number was achieved with a rubber coating having ~9 wt % alpha-1,3-glucan (NR-10wc). Further increases in the alpha-1,3-glucan content in the NR coatings reduced the Kit number. This trend seemed to indicate that, as the alpha-1,3-glucan content increased, the grease barrier performance of the coating more resembled the grease barrier performance of the paper substrate itself. Overall, the combination of NR with alpha-1,3-glucan at optimal concentration (e.g., about 5-15 wt %) provides good grease resistance. While NR is an important component to improve paper coating grease resistance, the resistance it offered was insufficient when used alone.

TABLE 3

Kit Numbers (Grease Barrier Level) of Paper Coatings

| Coating composition | Uncoated paper | NR | NR-10wc | NR-30wc | NR-50wc | NR-70wc | NR-100wc |
|---|---|---|---|---|---|---|---|
| Kit number | 0 | 3 | 10 | 4 | 4 | 4 | 1 |

Figure 4A:
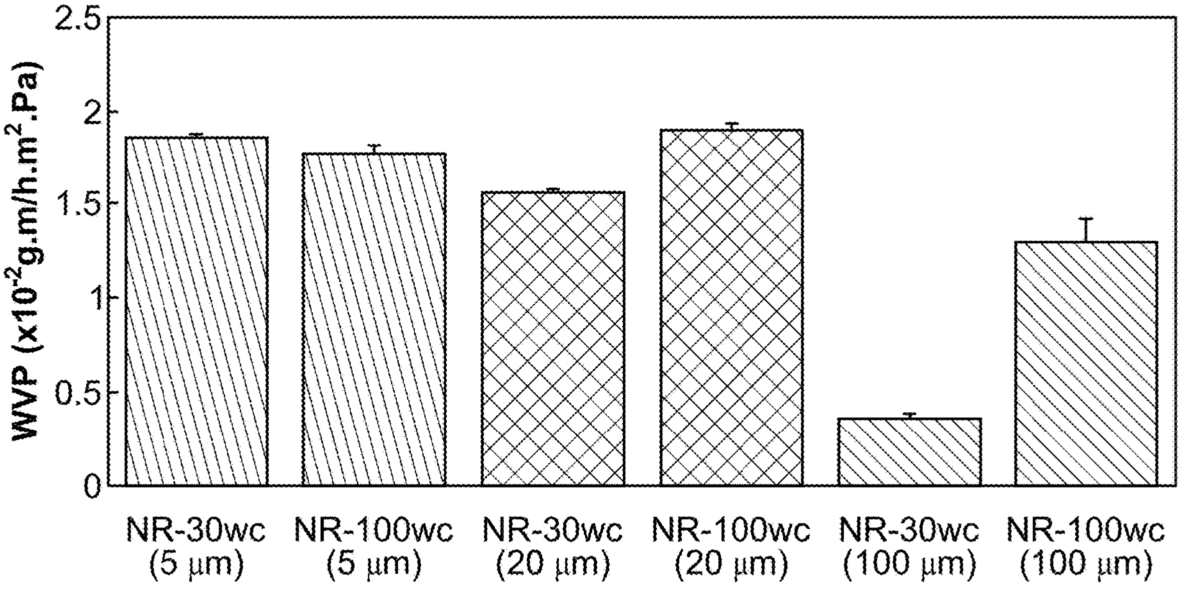
FIG. 4: Measurements of water vapor permeability (WVP, panel [a]), oil Cobb values (panel [b]), and oxygen permeability (OP, panels [c]) of paper having NR/alpha-1,3-glucan coatings of different thicknesses (5, 20, or 100 μm). Refer to Example 2.
Figure 4B:
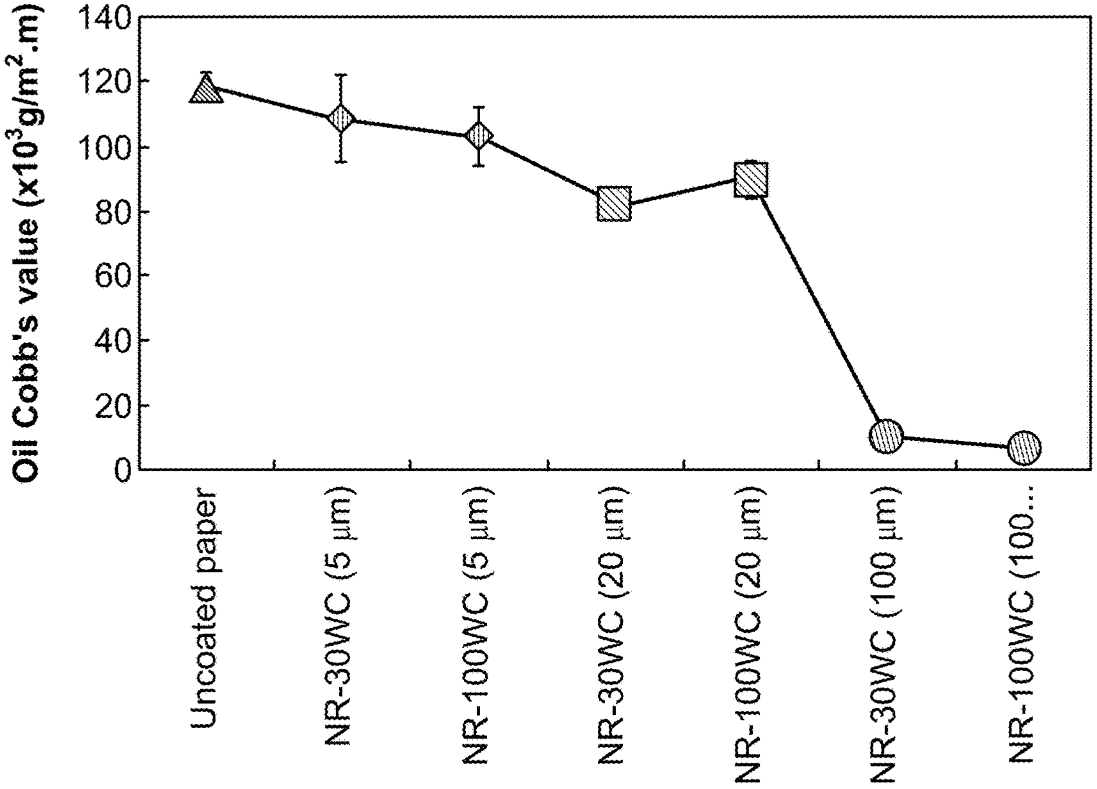
Figure 4C:
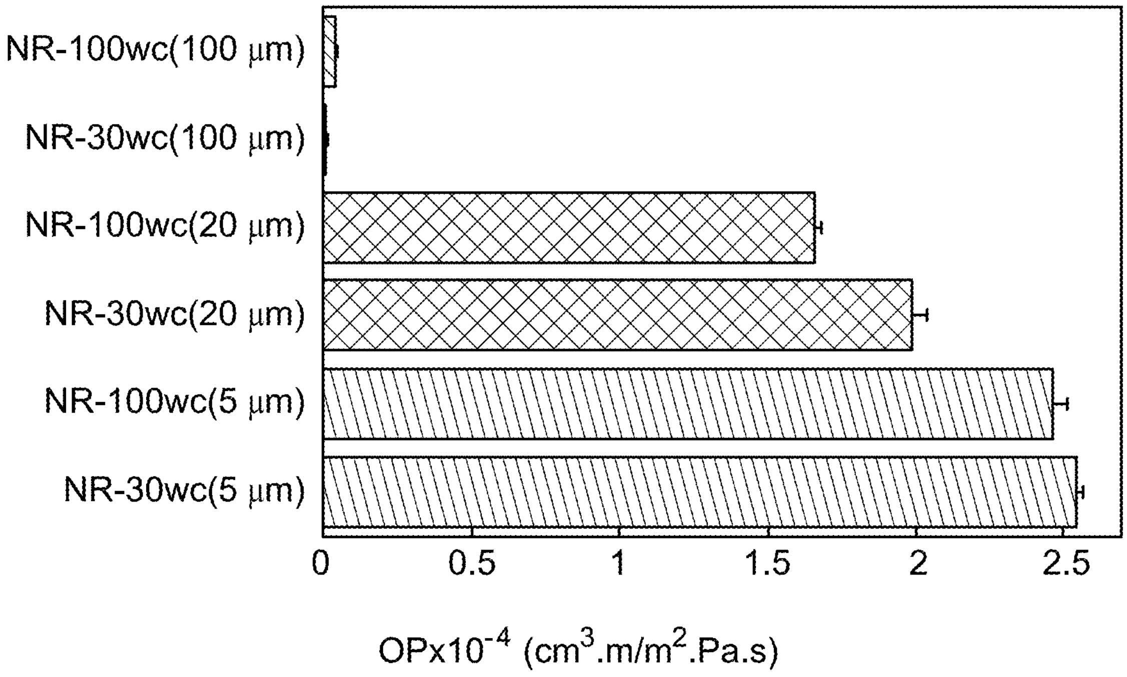
Figure 5A:
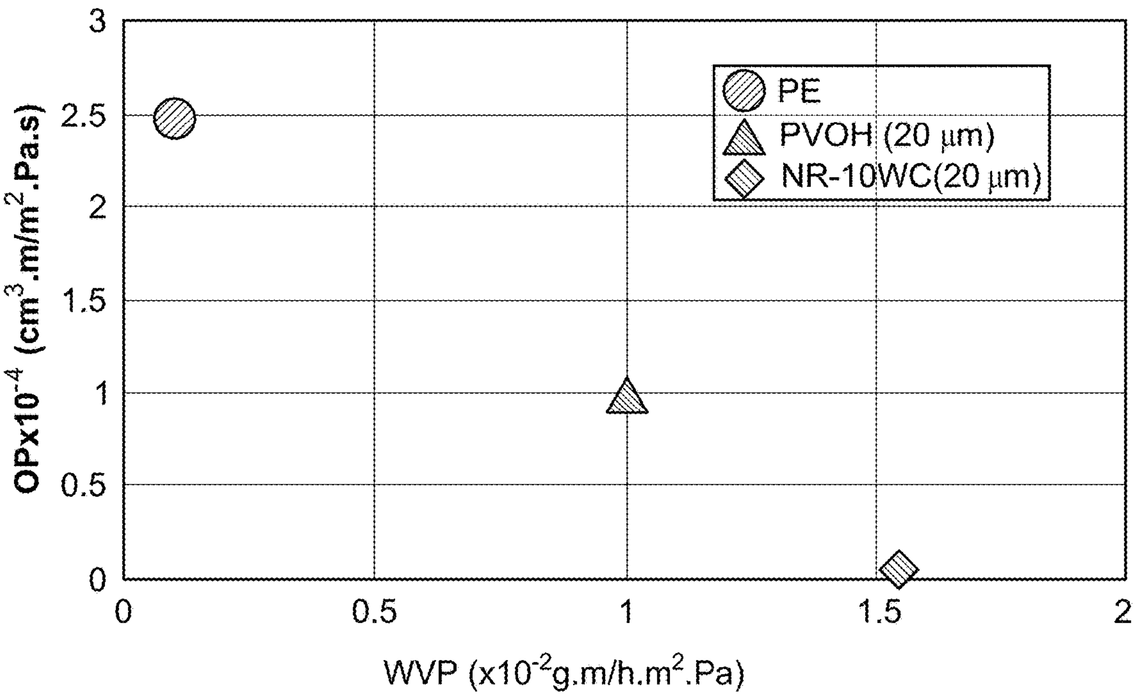
FIG. 5: Various measurements were made with paper coatings of PE, PVOH, or NR/alpha-1,3-glucan of various thicknesses (as shown). Oxygen permeability (OP) and water vapor permeability (WVP) were measured in panel (a). OP was measured in panel (b). WVP was measured in panel (c). Oil Cobb values were measured in panel (d). The effect of initial moisture content on the OP of coatings was measured in panel (e). Refer to Example 2.
Figure 5B:
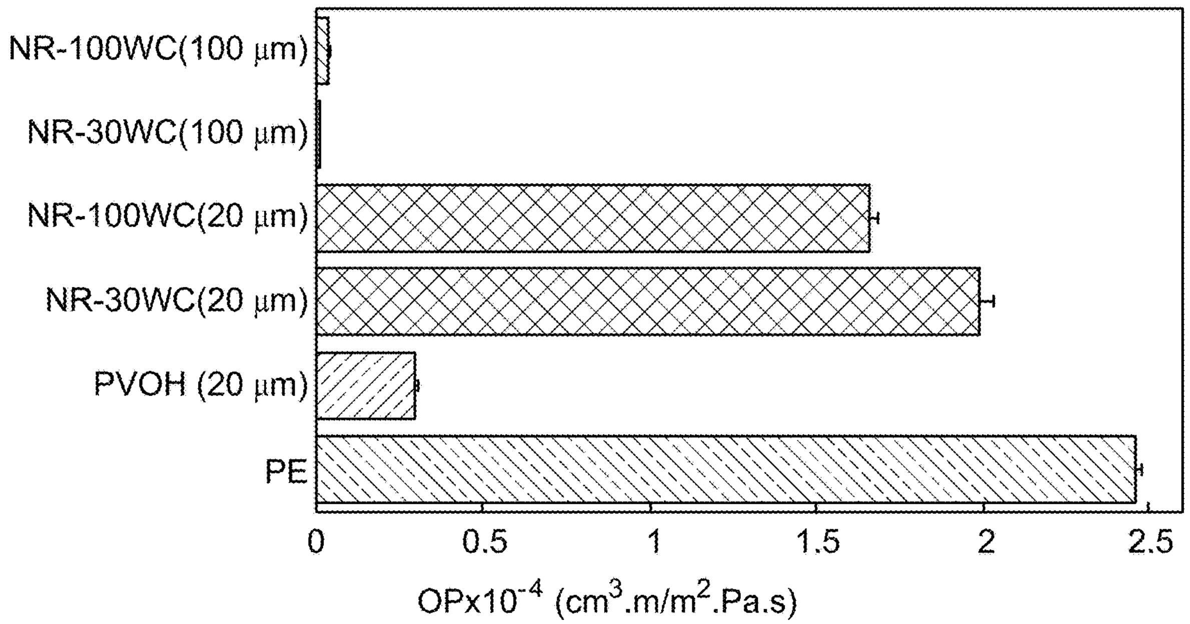
Figure 5C:
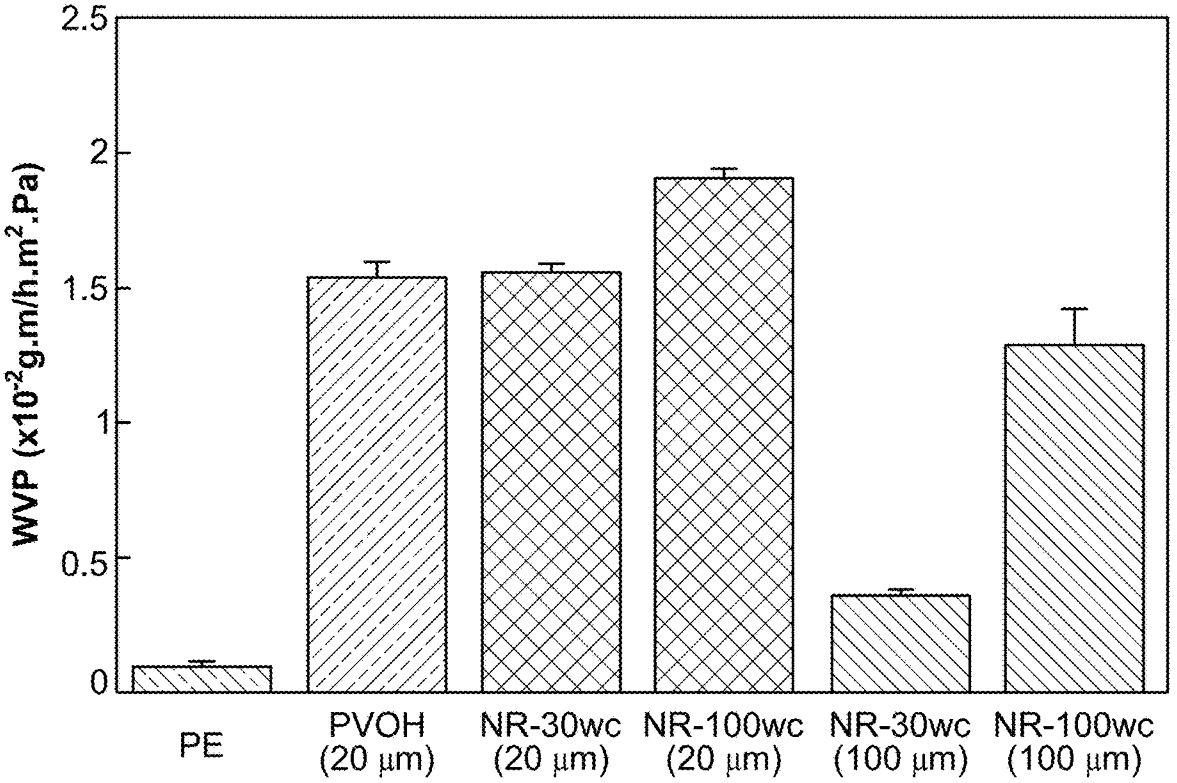
Figure 5D:
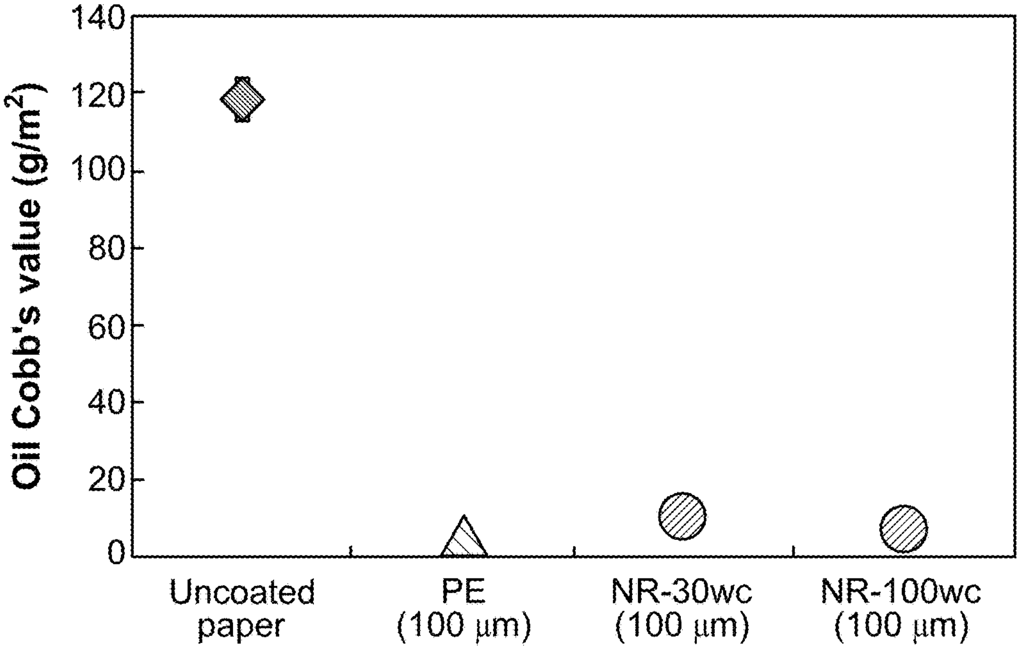
Figure 5E:
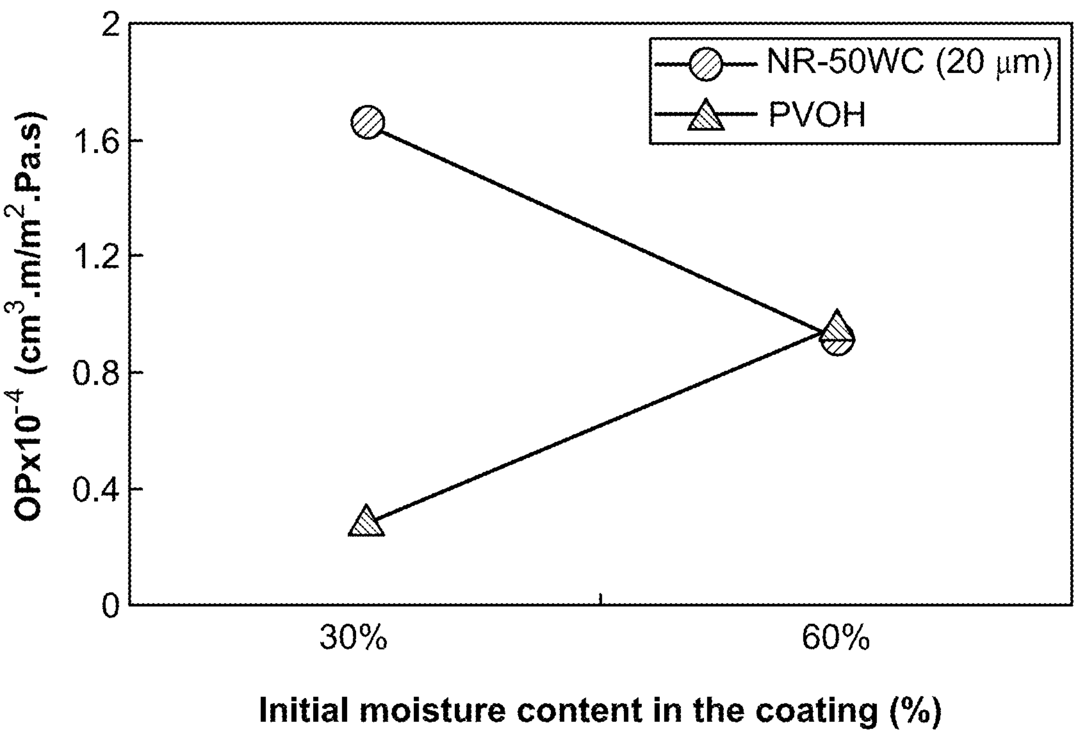

Effect of thickness on barrier properties: Coating thickness is one of the dominant parameters in determining barrier performance; thus, the effect of coating thickness on paper barrier properties was probed. Three different thicknesses, 5-, 20-, and 100-μm coatings on paper were prepared and their barrier performance against water vapor, oil, and oxygen was explored (FIG. 4). Water vapor barrier results (FIG. 4, panel [a]) showed that, as coating thickness was increased, water vapor permeability diminished; this was most apparent with the NR-30wc coating composition.

Furthermore, the influence of thickness on the oil barrier performance was inspected by the oil Cobb and Kit tests. As shown in (FIG. 4, panel [b]), a significant reduction in oil Cobb value was obtained by increasing the thickness of the paper coatings. It is noteworthy that the oil Cobb value was reduced by more than 99% with a 100-μm thick paper coat as compared to the oil Cobb value of untreated paper; this was achieved with both the NR-30wc and NR-100wc coatings. Kit values were measured for paper coated with a 100-μm coating of polyethylene (PE) or NR with alpha-1,3-glucan (NR-30wc or NR-100wc, Table 4). It is important to highlight that the tested NR/alpha-1,3-coatings provided Kit values as high as that achieved with PE, which is known to have excellent grease barrier properties (Lavoine et al., 2014, *Journal of Materials Science,* 49:2879-2893).

TABLE 4

Kit Numbers (Grease Barrier Level) of Paper Coated with PE or NR/Alpha-1,3-Glucan

| Coating composition | PE | NR-30wc (100 μm) | NR-100wc (100 μm) |
|---|---|---|---|
| Kit number | 12 | 12 | 12 |

The prevention of oxygen molecule permeation in coatings is an important challenge for food packaging applications. As shown in FIG. 4 (panel [c]), increasing the thickness of NR/alpha-1,3-coatings reduced the oxygen permeability of the coated paper.

Comparing Formulated Coatings with Commercial Coatings

To ensure that the formulated paper coatings in this Example are viable for the food packaging industry, the barrier properties of the disclosed NR/alpha-1,3-glucan coatings were compared with commercialized PE and PVOH paper coatings. As illustrated in FIG. 5 (panel [a], y-axis), an NR/alpha-1,3-glucan paper coating with 20 μm thickness provided a better oxygen barrier than PE, but less oxygen barrier than PVOH. On the other hand, the water vapor barrier of the 20-μm NR/alpha-1,3-glucan coating was less than that of PE, but better than that of PVOH (FIG. 5, panel [a], x-axis). Overall, the combined oxygen and moisture barrier properties of the NR/alpha-1,3 glucan coating was in between those of PVOH and PE, adjusted for thickness. Despite the fact that the formulated coating contained hydrophilic alpha-1,3-glucan particles, the WVP of the NR/alpha-1,3-glucan with 100 μm thickness was just slightly higher than the WVP of PE (FIG. 5, panel [c]), which is remarkable considering that it provides much better oxygen barrier than PE (FIG. 5, panel [b]).

An oil Cobb test was conducted to compare the oil barrier properties of PE and NR/alpha-1,3-glucan paper coatings. The oil Cobb results demonstrated that 100 μm thick NR/alpha-1,3-glucan coatings had oil Cobb values similar to that of a PE coating (FIG. 5, panel [d]).

The effect of humidity on the oxygen barrier performance of PVOH and NR/alpha-1,3-glucan paper coatings was also studied. Increasing moisture had a deteriorating effect on the oxygen barrier performance of the PVOH coating (FIG. 5, panel [e]). On the contrary, the increase in humidity had a positive effect on the oxygen barrier performance of the NR/alpha-1,3-glucan paper coating (FIG. 5, panel [e]).

Altogether, these results indicate that the paper coating compositions of the present disclosure comprising NR and alpha-1,3-glucan can compete with existing commercial paper coatings in the market.

Conclusions

The alpha-1,3 glucan used in this Example was derived from an enzymatic polymerization from sucrose and provides a sustainable and biodegradable material option. The spherical morphology and the colloidal dispersion format for this polysaccharide, wet cake, provides differentiation through high effective surface area, but also high crystallinity of the underlying polysaccharide. The process enables access to a highly controlled material with high purity that can be readily qualified for food contact applications in packaging.

Alpha-1,3 glucan particles were incorporated as a functional additive in natural rubber (NR) latex systems to formulate a sustainable paper coating material. The coating performance evaluation results above indicated that these formulated coatings improved the mechanical properties of the paper substrate, including the dry and wet strength, and modulus, without changing the flexibility and fold resistance; these results were attributed to the good interactions between the coatings and cellulose fibers of the base paper substrate. At sufficient thickness, this coating system allowed for successfully sealing of paper substrate pores. As a result, notable barrier property improvements versus oil, grease, oxygen, water and water vapor were achieved. The NR coating formulation with 10 phr alpha-1,3-glucan (9.09 wt %) provided an improved moisture, oxygen and grease barrier.

Overall, the NR/alpha-1,3-glucan coatings produced in this Example demonstrated high mechanical strength and barrier properties, both of which are essential properties in the food packaging industry. This performance demonstrates that the disclosed NR/alpha-1,3-glucan paper coating system is an appealing option for sustainable paper-based flexible packaging, particularly in the food packaging industry.

Example 3

Some of the insights provided in this Example are summarized as follows:

- Natural rubber latex and alpha-1,3-glucan blended together and used as a first coating of a multilayer system provided mechanical resistance (e.g., foldability) and liquid and gas barrier to paper and board substrates.
- There was excellent compatibility between natural rubber-based coatings (hydrophobic) and alpha-1,3-glucan-based coatings (hydrophilic); these layers can strongly adhere to each other. This compatibility provided excellent barrier and mechanical resistance functions.
- The use of alpha-1,3-glucan together with natural rubber provided rubber-containing coatings with little or no tackiness, which was present in coatings that only contained natural rubber.

A multilayer approach was tested in this Example to determine if it could provide liquid (oil, grease, and water) and gas (oxygen and water vapor) barrier function to paper and board substrates, such as those used in food packaging. In doing these analyses, this multilayer approach was found to provide barrier function not only to a flat substrate, but also to folds and creases made to the coated substrate; this form of mechanical resistance was not achieved by applying a layer of glucan alone. A multilayer approach can now be seen to provide barrier function with folding and creasing resistance to cellulosic fiber substrates, and so can be applied to paper and board substrates, either as flat substrates or as substrates with irregular shapes (e.g., trays).

Multilayered coatings herein are composed of two or more layers that are applied in subsequent steps as liquid dispersions, for example. The first layer applied on a substrate provided mechanical resistance upon folding and creasing. This first layer can be either (i) a 100% natural rubber layer (dry coat grammages ranging from 0.2 to 20 grams per square meter), or (ii) a blend of natural rubber with alpha-1,3-glucan (at 0.1 to 90 wt % of dried layer). Interestingly, the addition of alpha-1,3-glucan to natural rubber removed the inherent tackiness of the natural rubber. Other compounds such as elastomers or waxes can be applied as a first layer, either in pure form or blended with alpha-1,3-glucan. A blend of natural rubber, wax, etc., can also be prepared with other additives such as clay-based dispersions or inorganic solutions (e.g., sodium silicate) to provide additional oxygen barrier to paper.

Second and additional layers that were applied to the natural rubber-based layer consisted of an alpha-1,3-glucan-based compound (chemically unmodified, anionically charged, or cationically charged) applied as either a high pH (e.g., over pH 11) aqueous solution (i.e., caustic) (when using alpha-1,3-glucan unmodified alpha-1,3-glucan, which is insoluble in non-caustic aqueous conditions) or as a water-based solution (when using anionic- or cationic-derivatized alpha-1,3-glucan). The glucan-based layers provided oil and grease barrier, and could be further formulated with additives such as AKD (alkyl ketene dimer), ASA (alkenyl succinic anhydride), epoxidized oil (e.g., epoxidized linseed oil), sodium silicate, and/or inorganic filler (e.g., bentonite), amongst other additives, to provide further barrier performance. The second and subsequent layers could be of the same alpha-1,3-glucan-based compound (non-derivatized or derivatized), a combination of non-derivatized and derivatized alpha-1,3-glucan, or a layer of one or more other additives that provide liquid water and gas barrier. For example, a second layer can be a pure alpha-1,3-glucan-based layer (non-derivatized or derivatized) to provide oil and grease barrier, and a third layer can be alpha-1,3-glucan formulated with one or more additives to provide water barrier.

For second and additional layers, the content of alpha-1,3-glucan can range from 0 to 100 wt %, where any remainder is with one or more additives. The multilayered approach provided excellent oil and water barrier, and folding resistance, at coating grammages ranging from 1 to 50 grams per square meter.

The natural rubber layer was hydrophobic, while the alpha-1,3-glucan-based layers were hydrophilic. However, there was an excellent adhesion of alpha-1,3-glucan-based layers to the natural rubber layer. This good compatibility between the layers of these two compounds was noteworthy, as it was likely the reason for the superior barrier this multilayer approach provided against liquid and gas, even under folding and creasing stresses.

Oil and water barrier properties in this Example were quantified using Cobb oil and water tests (ISO 535, Tappi T441, SCAN P 12, EN 20535, DIN 53132, each incorporated herein by reference) using castor oil, olive oil, or water. These Cobb measurements lasted for 60 seconds for oil ("Cobb 60") and 300 seconds for the water ("Cobb 300"). Grease barrier was measured using the KIT test (TAPPI T559, incorporated herein by reference). Folding resistance was evaluated by folding a coated substrate (both inwards and outwards) applying a weight of 1 kg for 15 seconds to the fold, and applying olive oil for 60 seconds on the fold lines to assess if pinholes or other structural compromises were created in the coating(s). Structural compromises, if present, were observed as stains in the paper substrates. Coatings were applied using an automatic rod coater, though other deposition methods such as blade coating could also be used.

Paper samples coated with one, two, or three layers were evaluated for oil and water barrier, as well as maintenance of these barriers after folding (mechanical resistance). For all the sample coatings, an automatic rod coater was used with a rod that provided a wet film thickness of about 32 μm.

Figure 6:
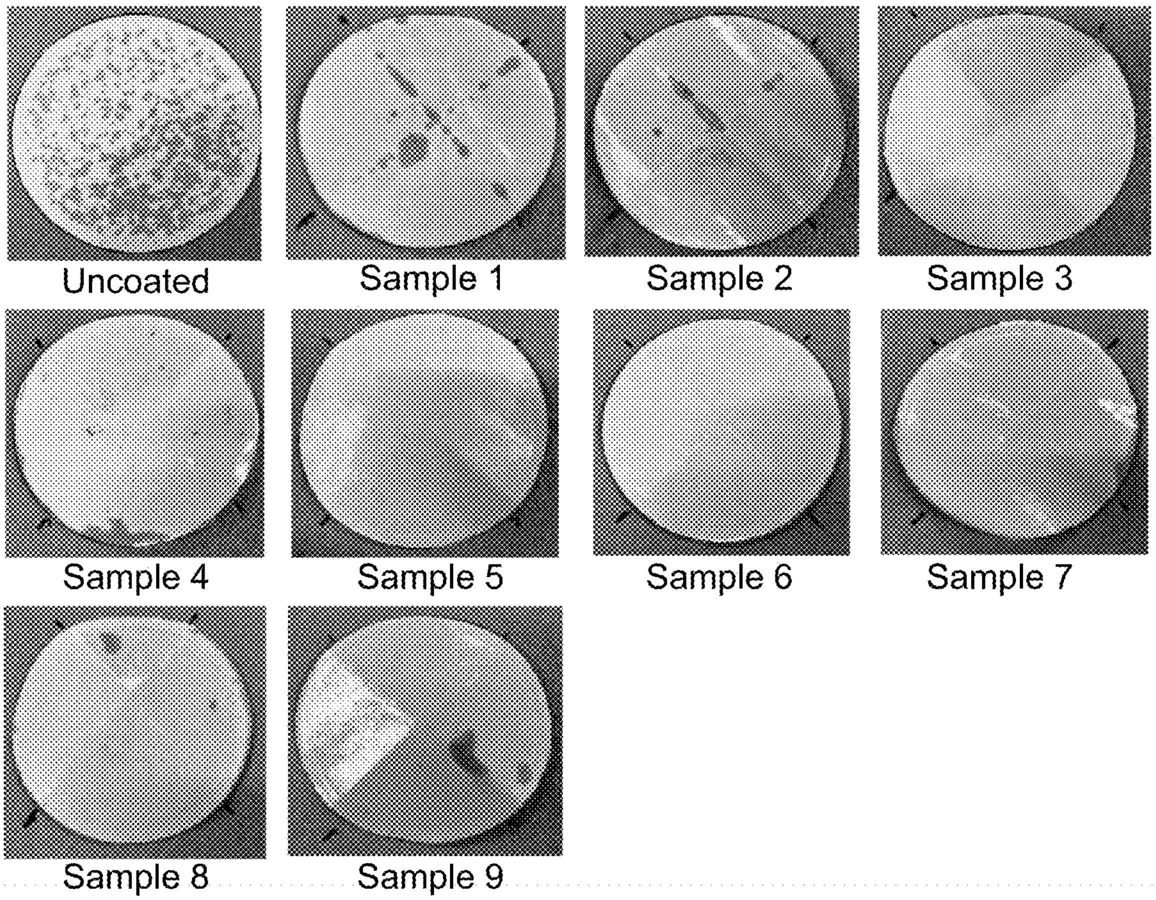
FIG. 6: Paper samples having various coatings (Samples 1-9, Table 5) were tested for oil (olive oil) barrier (Cobb 60) and resistance to oil penetration at fold creases. The uncoated paper control was not folded. Refer to Example 3.

Various paper coating strategies were tested (Samples 1-9, Table 5, FIG. 6). The alpha-1,3-glucan that was used had about 100% alpha-1,3 glycosidic linkages and a DPw of about 800. The natural rubber that was used was obtained as a low ammonia dispersion from Momentum Technologies. The AKD that was used was obtained as a dispersion from Kemira ((KD 574M).

"Layer 1" layers (Table 5) as dried on paper consisted of either pure natural rubber (Samples 3 and 4) or a blend of 25 wt % alpha-1,3-glucan and 75 wt % natural rubber (Samples 5, 6, 7, 8 and 9). These first layers were applied as water-based dispersions and allowed to dry on the paper surface at 50 °C for several minutes. The dispersion of rubber and glucan was prepared at room temperature using a kitchen blender.

"Layer 2" and "Layer 3" layers of Samples 1, 2, 4, 6 and 7 (Table 5) consisted of alpha-1,3-glucan. For producing these layers, a coating solution was first prepared by dissolving alpha-1,3-glucan (to 8 wt %) in 4 wt % NaOH aqueous solution at room temperature, and then applied directly to paper or a pre-existing paper coating (Table 5). "Layer 2" and "Layer 3" layers of Samples 8 and 9 (Table 5) were produced by making the above alpha-1,3-glucan solution in aqueous NaOH and adding AKD and natural rubber such that a dried film made with this preparation consisted of 40 wt % alpha-1,3-glucan, 40 wt % AKD and 20 wt % natural rubber. Dried coatings made with this formulation were referred to as "40/40/20". It is noted for clarity that "Layer 2" layers for Samples 1 and 2 are actually first layers laid directly on uncoated paper, whereas "Layer 2" layers of Samples 4 and 6-9 were applied to pre-existing rubber or rubber/glucan coatings (Table 5). After applying a Layer 2 to its respective substrate for producing Samples 2, 7 and 9 (Table 5), the layer was dried at 50 °C for several minutes before applying Layer 3. After the final layer was applied (either Layer 2 or 3, depending on the sample, Table 5), the coatings were neutralized with a 3 wt % citric acid solution, washed with water to remove the acid, and air-dried at room temperature for several hours.

The paper samples coated with 100 wt % alpha-1,3-glucan (Samples 1 and 2, Table 5) displayed excellent oil barrier (Cobb 60<5 gsm), poor water barrier (Cobb 300>20 gsm), and poor resistance to oil penetration at fold creases (FIG. 6).

The paper sample coated only with natural rubber (Sample 3, Table 5) had excellent water barrier, poor oil barrier, and good resistance to oil penetration at fold creases (FIG. 6). However, the surface of this sample was tacky and would not be amenable to processing under typical industrial settings. For example, since the rubber coating would stick to itself during the winding of paper into rolls, the coating would be damaged upon roll unwinding and make the unrolling process generally more difficult.

The paper sample coated with natural rubber and alpha-1,3-glucan (Sample 4, Table 5) had excellent oil and water barriers (Cobb values<5 gsm) and excellent resistance to oil penetration at fold creases (FIG. 6).

Paper Samples 5, 6 and 7 (Table 5), which each had a first coat of natural rubber blended with alpha-1,3-glucan, had excellent oil barrier (Cobb<5 gsm, Samples 6 and 7) and resistance to oil penetration at fold creases (FIG. 6).

The paper samples having one or two coats of the 40/40/20 formulation over a first coat of natural rubber blended with alpha-1,3-glucan (Samples 8 and 9, Table 5), had excellent oil barrier (Cobb 60<5 gsm), water barrier (Cobb 300<20 gsm), and resistance to oil penetration at fold creases (FIG. 6).

TABLE 5

Coated Paper Samples Tested for Oil and Water Barrier

| Sample | Layer 1 | Layer 2 | Layer 3 | Grammage (gsm) | Cobb 60 oil[a] (gsm) | Cobb 300 water (gsm) |
|---|---|---|---|---|---|---|
| Uncoated substrate | — | — | — | — | 9.3 | 86.4 |
| Sample 1 | — | 100% glucan | — | 8.0 | 0.9 | 58.1 |
| Sample 2 | — | 100% glucan | 100% glucan | 12.6 | 0.4 | 67.1 |
| Sample 3 | 100% natural rubber | — | — | 17.7 | 11.5 | 0.4 |
| Sample 4 | 100% natural rubber | 100% glucan | — | 23.0 | 0.8 | 0.8 |
| Sample 5 | 25% glucan 75% natural rubber | — | — | 9.4 | 6.6 | 3.0 |
| Sample 6 | 25% glucan 75% natural rubber | 100% glucan | — | 16.4 | 0.4 | 27.4 |
| Sample 7 | 25% glucan 75% natural rubber | 100% glucan | 100% glucan | 21.4 | 0.2 | 29.6 |
| Sample 8 | 25% glucan 75% natural rubber | 40% glucan 40% AKD 20% natural rubber | — | 19.0 | 1.9 | 8.9 |
| Sample 9 | 25% glucan 75% natural rubber | 40% glucan 40% AKD 20% natural rubber | 40% glucan 40% AKD 20% natural rubber | 22.3 | 2.4 | 11.2 |

[a]Olive oil

What is claimed is:

1. A coated product comprising a cellulose substrate, wherein at least a portion of the cellulose substrate is coated with at least one layer of a coating composition that comprises, on a dry weight basis, (i) about 20 wt % to about 40 wt % water-insoluble alpha-glucan, and (ii) a balance to about 100 wt % of natural rubber, wherein at least about 90% of the glycosidic linkages of the water-insoluble alpha-glucan are alpha-1,3 linkages, wherein the water-insoluble alpha-glucan has a weight-average degree of polymerization (DPw) of at least about 600, wherein the water-insoluble alpha-glucan comprises amorphous regions and has a crystallinity index equal to, or less than, 0.6, and wherein said layer of the coating composition has a tackiness that is less than 50% of the tackiness of a layer of a coating composition that comprises at least about 85 wt % rubber or other diene-based elastomer.

2. The coated product of claim 1, wherein the cellulose substrate is paper, cardboard, paperboard, corrugated board, or boxboard.

3. The coated product of claim 1, wherein the layer of the coating composition is at least about 10 microns.

4. The coated product of claim 1, wherein particles of the water-insoluble alpha-glucan in the layer of the coating composition that are immediately adjacent to cellulose fibers of the cellulose substrate interact with the cellulose fibers.

5. The coated product of claim 1, wherein the cellulose substrate is a packaging or container.

6. The coated product of claim 5, wherein the packaging or the container holds a second product, wherein the layer of the coating composition is in contact with the second product.

7. The coated product of claim 6, wherein the second product comprises oil, grease, and/or water on its surface, wherein at least a portion of the oil, grease, and/or water is contained inside the packaging or container.

8. The coated product of claim 6, wherein the second product is an ingestible product, pharmaceutical product, personal care product, home care product, or industrial product.

9. The coated product of claim 1, wherein the cellulose substrate as coated with the layer of the coating composition has at least one fold crease, and wherein the layer of the coating composition has resistance to oil or grease penetration at the fold crease.

10. The coated product of claim 1, wherein at least one overcoat comprising at least about 80 wt % of water-insoluble glucan is on said at least one layer of the coating composition.

11. The coated product of claim 10, wherein the water-insoluble glucan is alpha-glucan having at least about 50% alpha-1,3 glycosidic linkages.

12. The coated product of claim 1, wherein the cellulose substrate is a woven product.

13. The coated product of claim 1, wherein the cellulose substrate is a non-woven product.

* * * * *